US012649314B2

(12) United States Patent
Oki et al.

(10) Patent No.: US 12,649,314 B2
(45) Date of Patent: Jun. 9, 2026

(54) INK CONTAINER

(71) Applicant: BROTHER KOGYO KABUSHIKI KAISHA, Nagoya (JP)

(72) Inventors: Satoru Oki, Nagoya (JP); Masahiro Hayashi, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 141 days.

(21) Appl. No.: 18/789,040

(22) Filed: Jul. 30, 2024

(65) Prior Publication Data

US 2025/0042163 A1 Feb. 6, 2025

(30) Foreign Application Priority Data

Jul. 31, 2023 (JP) ................................. 2023-124418

(51) Int. Cl.
*B41J 2/175* (2006.01)

(52) U.S. Cl.
CPC ....... *B41J 2/17526* (2013.01); *B41J 2/17596* (2013.01)

(58) Field of Classification Search
CPC .. B41J 2/17526; B41J 2/17503; B41J 2/1753; B41J 2/17559
See application file for complete search history.

(56) References Cited

U.S. PATENT DOCUMENTS

2003/0085967 A1* 5/2003 Ota .......................... B41J 2/175 347/86
2009/0244224 A1* 10/2009 Koizumi ................ B41J 2/1752 347/87
2013/0162730 A1* 6/2013 Takagi ................. B41J 2/17546 347/86
2021/0300050 A1* 9/2021 Ishibe .................. B41J 2/17523
2022/0126590 A1* 4/2022 Oki ...................... B41J 2/17513

FOREIGN PATENT DOCUMENTS

JP 2003-145800 A 5/2003
JP 2017-52122 A 3/2017

* cited by examiner

*Primary Examiner* — Jason S Uhlenhake
(74) *Attorney, Agent, or Firm* — Merchant & Gould P.C.

(57) ABSTRACT

An ink container is insertable into an attachment unit. The ink container includes a main body that includes a chamber configured to store ink therein, a supply portion that extends forward from the chamber and is configured to supply the ink in the chamber to an outside of the main body; and an electrical interface that is positioned upward of the supply portion and apart from the supply portion and has an electrode.

9 Claims, 19 Drawing Sheets

INK CONTAINER

REFERENCE TO RELATED APPLICATIONS

This application claims priority from Japanese Patent Application No. 2023-124418 filed on Jul. 31, 2023. The entire content of the priority application is incorporated herein by reference.

BACKGROUND ART

An ink cartridge in which ink is stored is known. This kind of ink cartridge is inserted into a cartridge attachment unit of a printer in an insertion direction intersecting a vertical direction, and is removed from the cartridge attachment unit in a removal direction opposite to the insertion direction.

SUMMARY

An ink container is insertable into an attachment unit. The ink container includes a main body that includes a chamber configured to store ink therein, a supply portion that extends forward from the chamber and is configured to supply the ink in the chamber to an outside of the main body; and an electrical interface that is positioned upward of the supply portion and apart from the supply portion and has an electrode.

BRIEF DESCRIPTION OF THE DRAWINGS

FIG. 13A is a cross-sectional view of the ink cartridge 30 and the cartridge case 110, taken along a vertical plane intersecting a lower surface 70 of the ink cartridge 30.

FIG. 13B is a cross-sectional view of the ink cartridge 30 and the cartridge case 110, taken along a vertical plane intersecting a first key portion 77 of the ink cartridge 30.

FIG. 14A is a cross-sectional view of the ink cartridge 30 and the cartridge case 110, taken along a vertical plane intersecting a lower surface 70 of the ink cartridge 30.

FIG. 14B is a cross-sectional view of the ink cartridge 30 and the cartridge case 110, taken along a vertical plane intersecting a first key portion 77 of the ink cartridge 30.

FIG. 15A is a cross-sectional view of the ink cartridge 30 and the cartridge case 110, taken along a vertical plane intersecting a lower surface 70 of the ink cartridge 30.

FIG. 15B is a cross-sectional view of the ink cartridge 30 and the cartridge case 110, taken along a vertical plane intersecting a first key portion 77 of the ink cartridge 30.

FIG. 16A is a cross-sectional view of the ink cartridge 30 and the cartridge case 110, taken along a vertical plane intersecting a lower surface 70 of the ink cartridge 30.

FIG. 16B is a cross-sectional view of the ink cartridge 30 and the cartridge case 110, taken along a vertical plane intersecting a first key portion 77 of the ink cartridge 30.

DESCRIPTION

Figure 1:
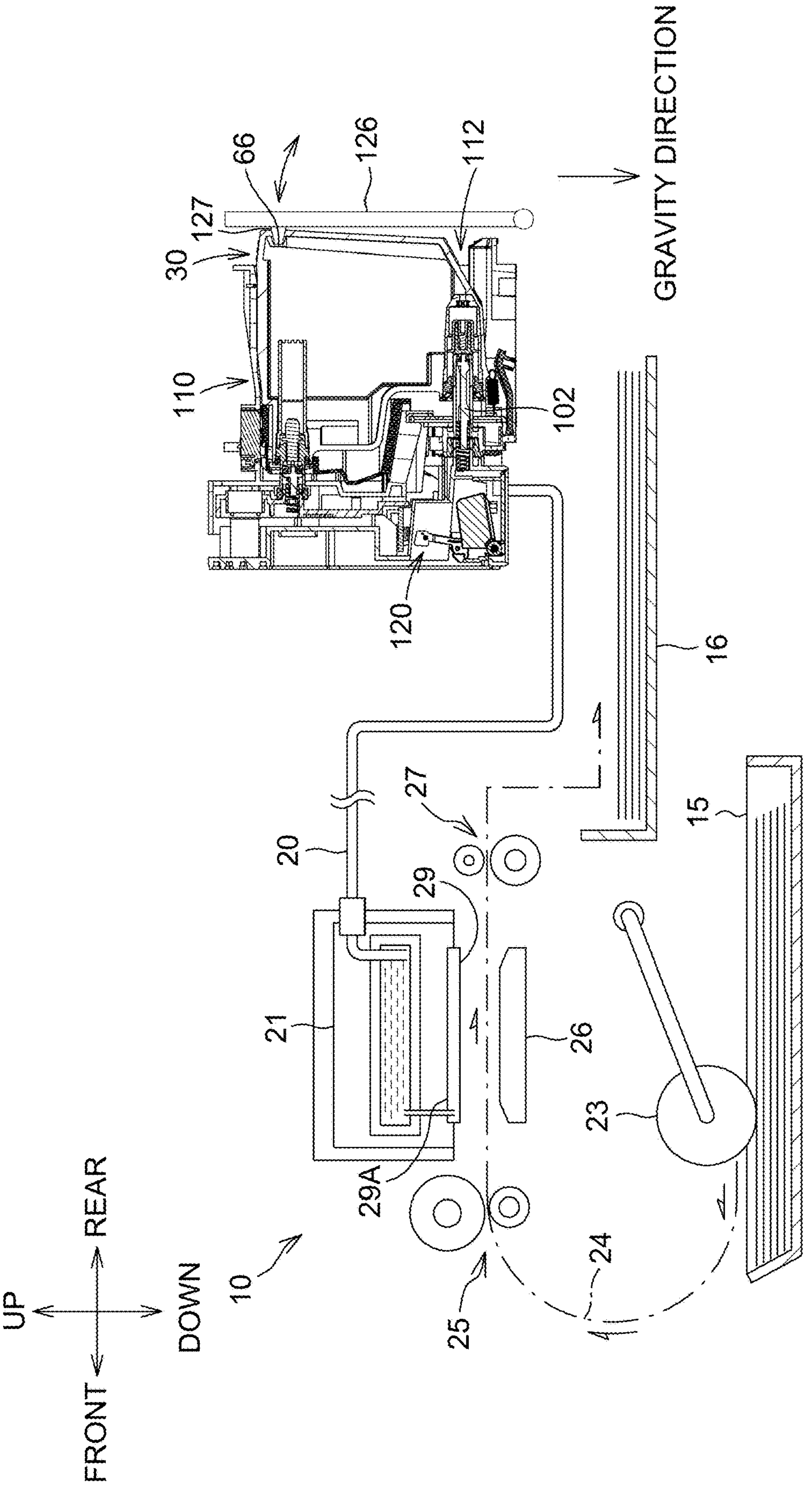
FIG. 1 is a longitudinal sectional view schematically showing an internal structure of a printer 10.

For example, an ink cartridge has a front wall defining a front end in an insertion direction and a rear wall defining a rear end. The ink cartridge also has a left wall defining a left end of the ink cartridge and a right wall defining a right end of the ink cartridge between the front wall and the rear wall. The ink cartridge has a substrate support portion connecting the right wall and the left wall. An IC board having an electrode is supported by the substrate support portion. The electrode of the IC board is electrically connected to a contact of the cartridge attachment unit in a state where the ink cartridge is attached to the cartridge attachment unit. Further, a space recessed from the front wall in the removal direction is provided at the front end and the upper end in the vertical direction of the ink cartridge. The rear portion of the space is defined at its upper end by the substrate support. The front portion of the space is open in the insertion direction and the upward direction. The space of the ink cartridge receives a protrusion provided on the cartridge attachment unit in a state where the ink cartridge is attached to the cartridge attachment unit.

The ink cartridge has a space at the front end and the upper end thereof, and therefore the strength of the periphery of the space is lower than that of other portions. Therefore, when the ink cartridge falls on the floor and a strong impact is applied to the right wall or the left wall defining the space of the ink cartridge, the impact is transmitted to the substrate support portion connecting the right wall and the left wall, and there is a possibility that the substrate support portion is deformed. When the substrate support portion is deformed, the position of the electrode of the IC board on the substrate support portion is moved from the position before the deformation, and a connection failure between the electrode and the contact of the cartridge attachment unit may occur.

The present disclosure provides an ink container that enables an electrode of an electrical interface thereof to be less likely to be displaced.

(1) The present disclosure relates to an ink container. The ink container is insertable into an attachment unit. The ink container includes: a main body that includes a chamber configured to store ink therein; a supply portion that extends forward from the chamber and is configured to supply the ink in the chamber to an outside of the main body; and an electrical interface that is positioned upward of the supply portion and apart from the supply portion and has an electrode. The main body includes: a first wall; a second wall that is continuous with the first wall and faces rightward; a third wall that is continuous with the first wall and faces leftward; and a fourth wall that is continuous with the second wall and the third wall and faces upward. The electrical interface is positioned on the fourth wall. The fourth wall has a through hole positioned forward of the electrode and has a front end portion that defines a front end of the fourth wall and a front end of the through hole.

For example, even if a strong impact is generated around the front end portion of the main body when the ink container falls on a floor, the front end portion is easily deformed, and thus the impact of the falling is easily absorbed by the front end portion. Since the through hole is located between the front end portion and the electrode of the electrical interface, the force generated by the deformation of the front end portion is easily dispersed to the second wall and the third wall connected to the front end portion. Therefore, since the impact is unlikely to be transmitted from the front end portion to the periphery of the electrical interface on the fourth wall, deformation of the periphery of the electrical interface on the fourth wall is suppressed, and the electrode of the electrical interface is unlikely to be displaced. As a result, when the ink container is attached to the attachment unit, the connection failure between the electrode of the electrical interface and the contact of the attachment unit is suppressed.

(2) The front end portion has a front end whose right end and left end are continuous with the first wall.

Since the force generated by the deformation of the front end portion is easily dispersed to the first wall, the strength of the front end portion is improved.

(3) The first wall has a second through hole positioned downward of the front end portion.

(4) The main body includes: a first member that includes a partition wall defining the chamber; and a second member that includes the first wall, the second wall, the third wall, and the fourth wall. The first member is attached to the second member to be movable in an up-down direction with respect to the second member. The partition wall has a portion that is an upper end and a front end thereof, and the portion is positioned below the through hole Since the first member is movable in the up-down direction relative to the second member having the fourth wall on which the electrical interface is positioned, the position of the electrical interface can be determined in the attachment unit independently of the first member. Therefore, the electrical interface can be easily aligned with the attachment unit. Even if the front end and the upper end of the first member move upward due to the first member moving in the up-down direction relative to the second member when the ink container is attached to the attachment unit, the front end and the upper end of the first member are positioned below the through hole of the second member. Thus, the through hole suppresses the upper end and the front end of the first member from contacting the fourth wall.

(5) The front end portion has an upper surface that faces upward. The main body includes: a first protrusion that is positioned rightward of the through hole and protrudes upward from the upper surface; and a second protrusion that is positioned leftward of the through hole and protrudes upward from the upper surface.

Since the force generated by the deformation of the front end portion is easily dispersed to the first protrusion and the second protrusion, the strength of the front end portion is improved.

(6) The front end portion has: an upper surface that faces upward; and an inclined surface adjacent to a front of the upper surface and inclined with respect to the upper surface so as to extend downward toward a front.

When the ink container is attached to the attachment unit, the guide of the attachment unit comes into contact with the inclined surface, and thus the ink container is easily guided to an appropriate position in the up-down direction.

(7) The fourth wall has: a first portion that is continuous with a rear end of the front end portion and extends leftward from the second wall; and a second portion that is continuous with the rear end of the front end portion and extends rightward from the third wall. The first portion defines a right end of the through hole. The second portion defines a left end of the through hole.

Since the force generated by the deformation of the front end portion is easily dispersed rearward from the front end portion, the strength of the front end portion is improved.

(8) The through hole has a length, in a direction orthogonal to a front direction and an upward direction, that decreases toward a rear.

Since the force generated by the deformation of the front end portion is more easily dispersed from the front end portion to the rear, the strength of the front end portion is improved.

(9) the first member has an atmosphere communication path configured to communicate with the chamber and an outside. The ink container further includes a valve positioned in the first member and configured to open and close the atmosphere communication path. The valve is exposed through the atmosphere communication path and the second through hole. The second through hole is configured to receive a protrusion that extends from the attachment unit.

When the ink container is attached to the attachment unit, in the case where the second through hole receives the protrusion, the valve is pressed by the protrusion, and thus the atmosphere communication path is opened. Therefore, when the ink in the chamber is supplied to the outside of the main body, air easily flows into the chamber through the atmosphere communication path, and thus the ink in the chamber is easily supplied to the outside of the main body.

According to the present disclosure, the electrode of the electrical interface of the ink container is less likely to be displaced.

Hereinafter, embodiments of the present disclosure will be described with reference to the drawings as appropriate.

In the following, an ink cartridge 30 is inserted into and removed from a cartridge case 110 in a horizontal direction (a direction orthogonal to the gravity direction). Further, whenever appropriate, a frontward direction and a rearward direction may be collectively referred to as a front-rear direction. An upward direction and a downward direction may be collectively referred to as an up-down direction. A rightward direction and a leftward direction may be collectively referred to as a right-left direction. The description will be made on the assumption that the front-rear direction and the right-left direction are horizontal directions. Further, a vertical direction orthogonal to the front-rear direction is defined as the up-down direction. A direction orthogonal to the up-down direction and the front-rear direction is defined as the right-left direction. Note that an attached state in which the ink cartridge 30 is attached to the cartridge case 110 is a state in which the ink cartridge 30 has been inserted to an attachment position in the cartridge case 110 and is ready to be used with the printer 10. The attachment position is a position at which a supply tube 102 provided in the cartridge case 110 is inserted into a supply port 34 provided in the ink cartridge 30 and is connected to the supply port 34.

Hereinafter, the posture of the ink cartridge 30 when the ink cartridge 30 is in the attached state and is ready to be used with the printer 10 is referred to as a usage posture or an upright posture. Unless otherwise specified, when the positional relations between the components of the ink cartridge 30 are described with the terms "up", "down", "left", "right", "front", and "rear" and when the orientations or directions of the components of the ink cartridge 30 are described with the terms "up", "down", "left", "right", "front", and "rear", such descriptions are made based on when the ink cartridge 30 is in the usage posture. Moreover, when the positions, orientations or directions of the ink cartridge 30 itself is described with the terms "up", "down", "left", "right", "front", and "rear", such descriptions are made based on when the ink cartridge 30 is in the usage posture. The ink cartridge 30 is inserted into the cartridge case 110 in the frontward direction, which direction may be referred to as an attachment direction. The ink cartridge 30 is removed from the cartridge case 110 in the rearward direction. When it is described that a component of the ink cartridge 30 faces a certain direction, the direction in which the component faces is not strictly limited to that certain direction only. For example, when it is described that "a front surface faces frontward", the front surface may face frontward and upward.

Figure 7:
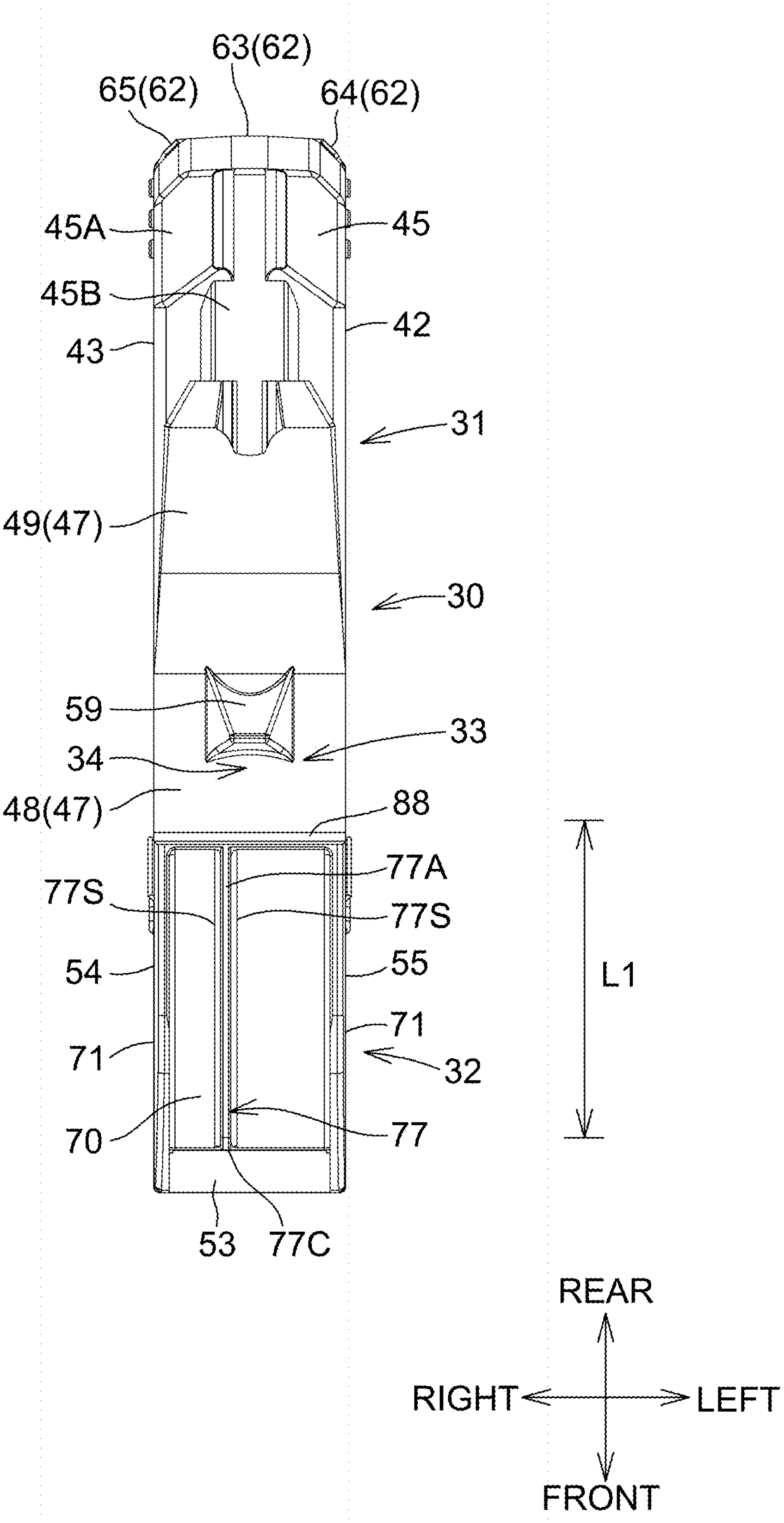
FIG. 7 is a bottom view of the ink cartridge 30.
Figure 8:
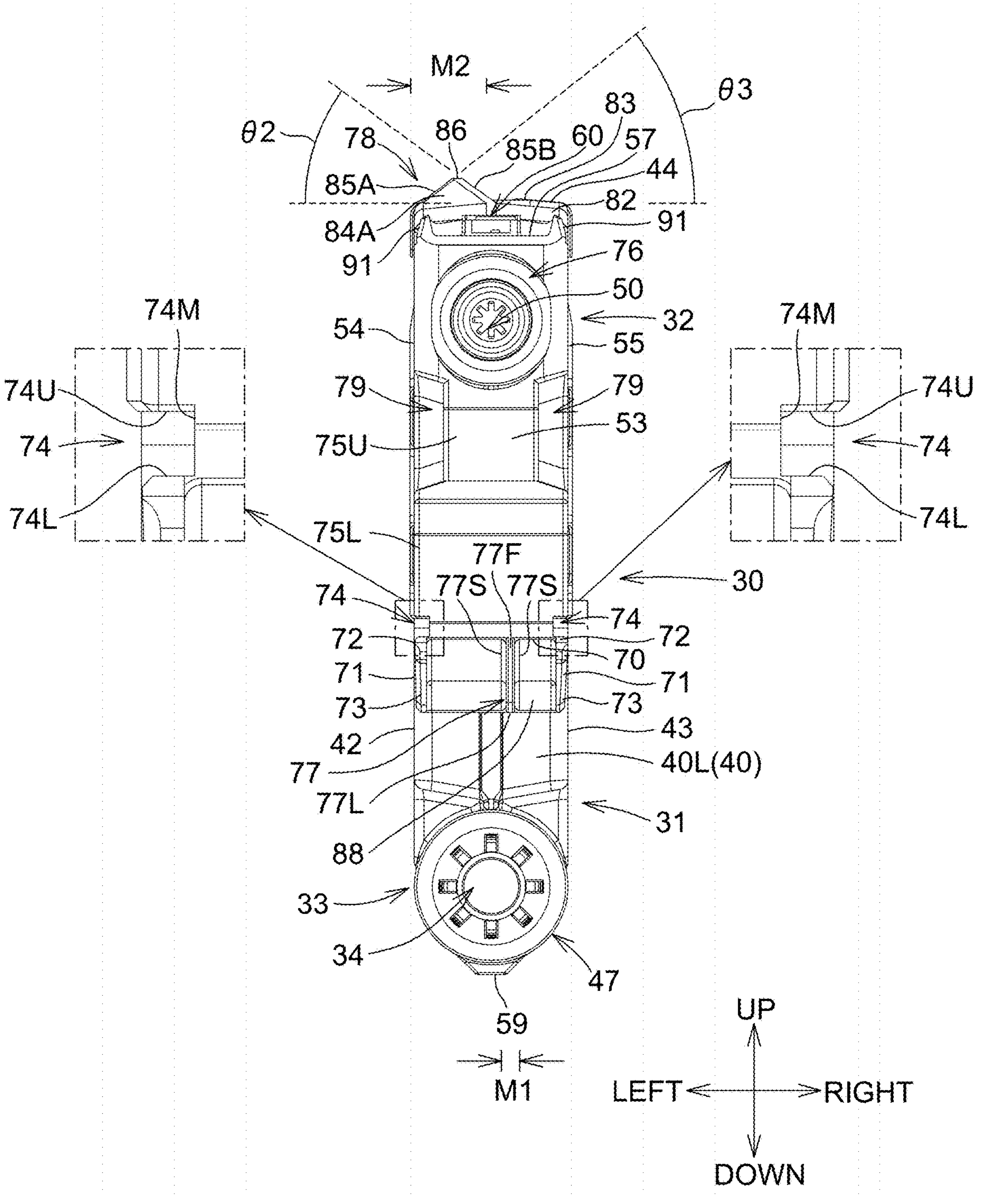
FIG. 8 is a front view of the ink cartridge 30.

A front surface of the ink cartridge 30 is a surface appearing in the front view shown in FIG. 8. A rear surface of the ink cartridge 30 is a surface appearing in the rear view shown in FIG. 9. An upper surface of the ink cartridge 30 is a surface appearing in the plan view shown in FIG. 6. A lower surface of the ink cartridge 30 is a surface appearing in the bottom view shown in FIG. 7. A left surface of the ink cartridge 30 is a surface appearing in the left side view shown FIG. 10. A right surface of the ink cartridge 30 is a surface appearing in the right side view shown in FIG. 5.

[Outline of Printer 10]

As shown in FIG. 1, the printer 10 includes the cartridge case 110, a sub-tank 120, an ink tube 20, a recording head 21, and the ink cartridge 30. The printer 10 is an inkjet recording apparatus, for example, an inkjet printer that records an image by ejecting ink droplets from the recording head 21 onto a sheet on the basis of an inkjet recording method. The printer 10 includes the cartridge case 110. The cartridge case 110 is an example of an attachment portion.

The ink cartridge 30 is configured to be attached to the cartridge case 110. The ink cartridge 30 is an example of an ink container. The cartridge case 110 has an opening 112 at its rear end. The ink cartridge 30 is configured to be inserted frontward into the case 110 through the opening 112 and to be attached to the case 110 when the ink cartridge 30 reaches the attachment position. The ink cartridge 30 is configured to be detached and removed rearward from the case 110 through the opening 112. The opening 112 is covered by a cover 126 when the cover 126 is closed and is exposed to the outside of printer 10 when the cover 126 is opened. FIG. 1 shows a state in which the ink cartridge 30 is completely attached to the cartridge case 110. That is, FIG. 1 shows the ink cartridge 30 in the attached state. The posture of the ink cartridge 30 in the attached state is the usage posture.

The ink cartridge 30 stores ink that can be used in the printer 10. The ink may be a liquid containing a coloring material such as a pigment or a processing liquid not containing a coloring material, but containing an additive for improving the quality of image formed by the coloring material. In a state where the ink cartridge 30 is completely attached to the cartridge case 110, that is, when the ink cartridge 30 is in the attached state, the ink cartridge 30 and the recording head 21 are connected to each other via the ink tube 20. The recording head 21 discharges the ink supplied from the ink cartridge 30 from a plurality of nozzles 29. Specifically, a head control board included in the recording head 21 selectively applies a driving voltage to a plurality of piezoelectric elements 29A provided corresponding to the plurality of nozzles 29. As a result, ink is selectively ejected from the nozzles 29. That is, the recording head 21 consumes the ink stored in the ink cartridge 30 attached to the cartridge case 110.

The printer 10 includes a paper feed tray 15, a paper feed roller 23, a pair of conveyance rollers 25, a platen 26, a pair of discharge rollers 27, and a paper discharge tray 16. The paper feed roller 23 feeds a sheet on the paper feed tray 15 toward the conveyance path 24. The sheet fed to the conveyance path 24 reaches the pair of conveyance rollers 25. The pair of conveyance rollers 25 conveys the sheet that has reached the pair of conveyance rollers 25 onto the platen 26. The recording head 21 selectively ejects ink onto the sheet passing over the platen 26. Thus, an image is recorded on the sheet. The sheet having passed through the platen 26 reaches the pair of discharge rollers 27. The pair of discharge rollers 27 discharges the sheet that has reached the pair of discharge rollers 27 to the discharge tray 16 positioned at the most downstream end of the conveyance path 24.

[Cartridge Case 110]

Figure 2:
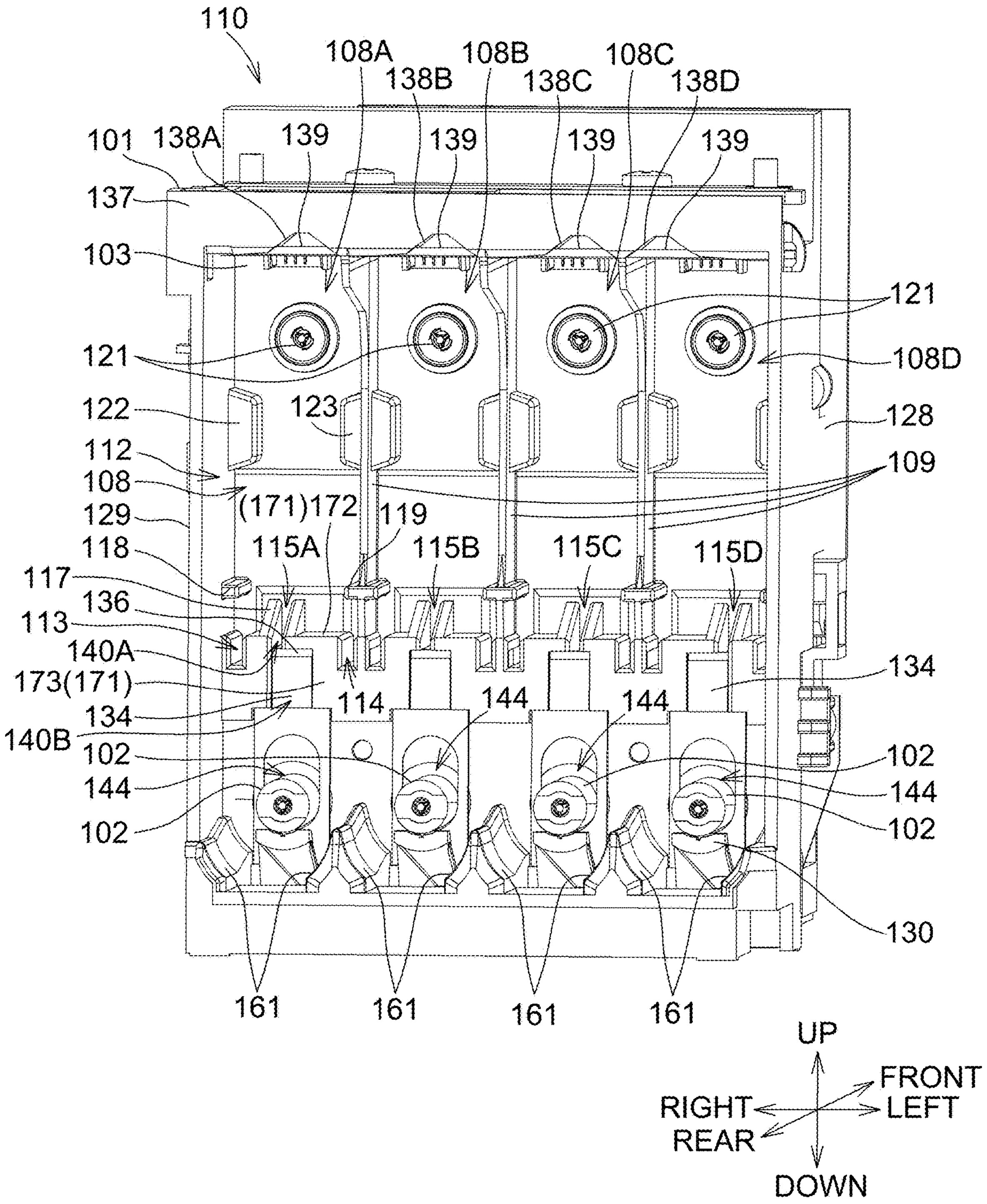
FIG. 2 is a rear perspective view of a cartridge case 110.

As shown in FIG. 2, the cartridge case 110 includes a case body 101 and a supply tube 102.

The case body 101 has a box shape. The case body 101 has an internal space to which the ink cartridge 30 is attached. The case body 101 has an end surface 103 that defines a front end in the attachment direction when the ink cartridge 30 is attached to the internal space, a left wall that defines a left end of the internal space, a right wall that defines a right end of the internal space, a lower wall, and a cover wall 171 that covers a pressing plate 134 described later. The cover wall 171 includes an upper wall 172 facing upward and a rear wall 173 extending downward from a rear end portion of the upper wall 172. The case body 101 has the opening 112 at its rear end. When the user opens the cover 126 to use the printer 10, the opening 112 is exposed.

The case body 101 has three partition walls 109 in its internal space. The three partition walls 109 are arranged at intervals in the left-right direction. The internal space of the case body 101 has four slots 108A, 108B, 108C, and 108D arranged in the left-right direction. The slot 108A is positioned on the rightmost side among the four slots 108A to 108D. The slot 108B is positioned to the left of the slot 108A. The slot 108C is positioned to the left of the slot 108B. The slot 108D is positioned on the left of the slot 108C and on the leftmost side among the four slots 108A to 108D. The internal space of the case body 101 is partitioned into slots 108A, 108B, 108C, and 108D by three partition walls 109 that partition the internal space of the case body 101 and by the inner surface of the case body 101.

The partition wall 109 extends upward from the upper surface of the upper wall 172 of the cover wall 171. Three partition walls 109 are positioned at equal intervals in the left-right direction. The partition wall 109 has a flat plate shape extending in the up-down direction and the left-right direction. The partition wall 109 extends from the front end to the rear end of the upper wall 172.

Figure 13A:
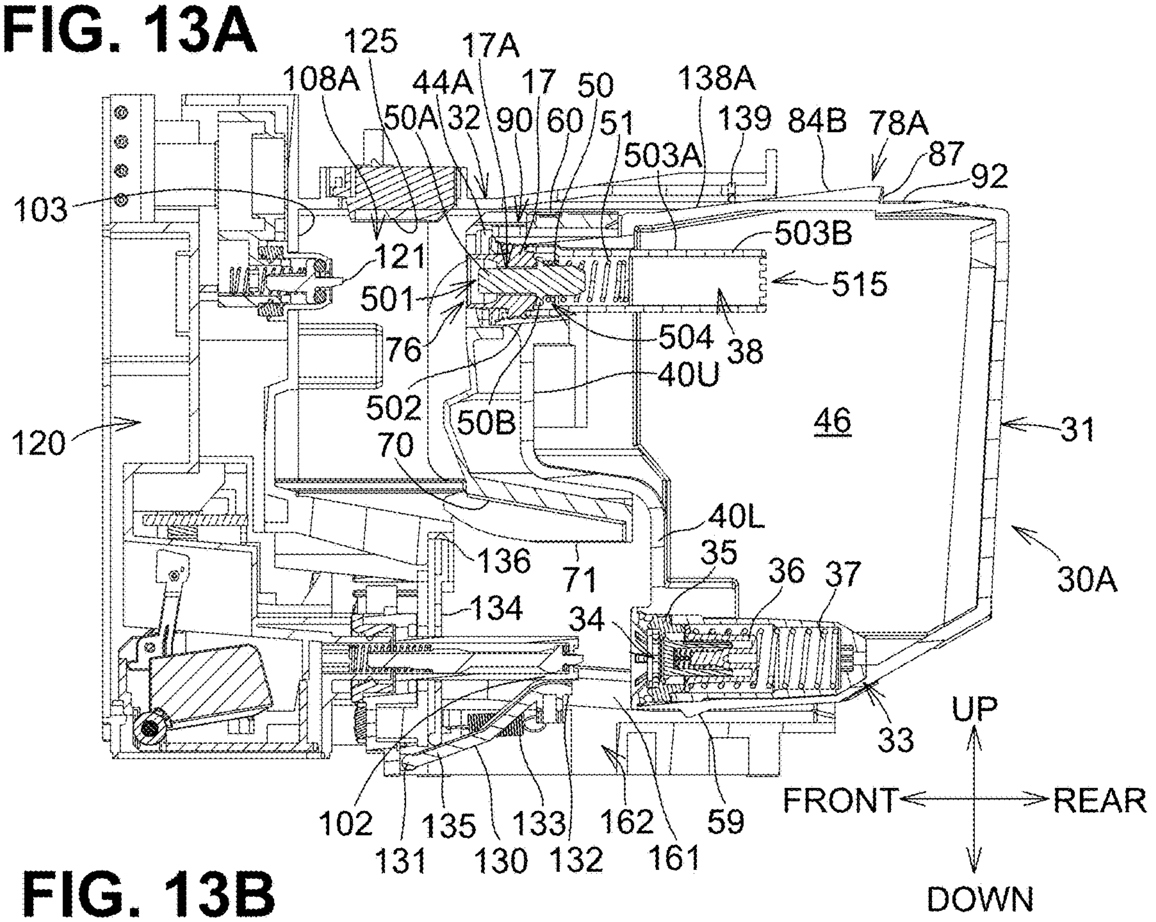
FIGS. 13A and 13B are cross-sectional views of the ink cartridge 30 and the cartridge case 110, each showing a state where the ink cartridge 30 is positioned in the cartridge case 110 and an ink receiving member 130 is positioned at a first position.
Figure 13B:
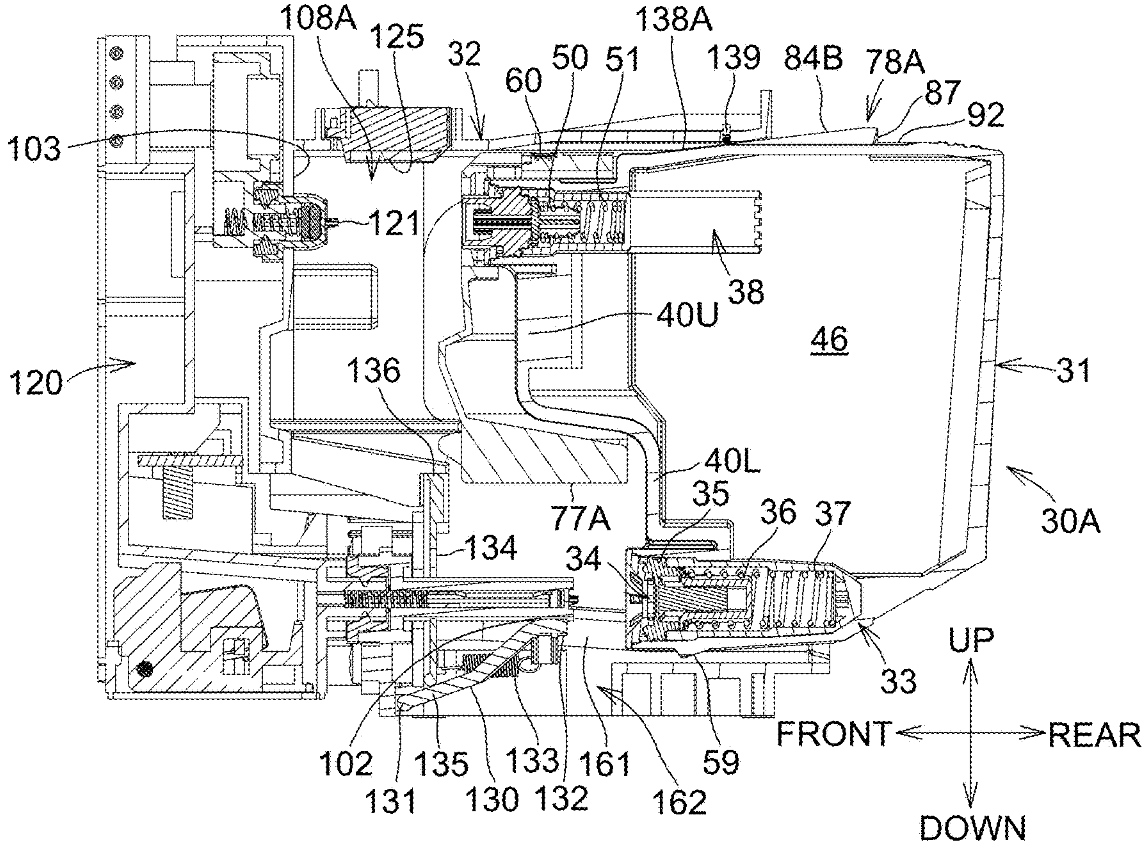

The case body 101 has a guide surface 161. The guide surface 161 is arranged in each of the slots 108A, 108B, 108C, and 108D. The guide surface 161 faces upward. The guide surface 161 is generally a semi-circumferential surface. When the ink cartridge 30 is attached to or detached from the case body 101, the guide surface 161 guides the ink cartridge 30 in the front-rear direction. The guide surface 161 supports the lower end of the ink cartridge 30 in the attached state where the ink cartridge 30 is attached to the case body 101. As shown in FIGS. 13A and 13B, a space 162 exists below the supply tube 102.

As shown in FIG. 2, the cover wall 171 is positioned below the end surface 103 of the case body 101. The upper wall 172 has a flat plate shape extending in the front-rear direction and the left-right direction. The upper wall 172 extends from the left wall to the right wall of the case body 101. The rear wall 173 has a flat plate shape extending in the up-down direction and the left-right direction. The rear wall 173 extends from the left wall to the right wall of the case body 101. In the rear wall 173, through holes 144 are positioned at equal intervals in the left-right direction in the respective slots 108A, 108B, 108C, and 108D. The guide surface 161 is positioned below the through hole 144. The supply tube 102 passes through the through hole 144 and protrudes rearward from the rear wall 173.

In each slot 108A, 108B, 108C, and 108D, the top wall 172 has a groove 113 and a groove 114. The groove 113 and the groove 114 in each of the slots 108A, 108B, 108C, and 108D have a common shape. The groove 113 is positioned at the left end of each of the slots 108A, 108B, 108C, and 108D, and the groove 114 is positioned at the right end of each of the slots 108A, 108B, 108C, and 108D. Both the groove 113 and the groove 114 are recessed downward from the upper wall 172 and extend along the front-rear direction so as to be open in the rear wall 173. The ink cartridge 30 includes a pair of walls 71 (described later) and each wall 71 is inserted into the corresponding one of the groove 113 and the groove 114.

In each of the slots 108A, 108B, 108C, and 108D, two protruding pieces 117 protruding upward from the upper wall 172 of the cover wall 171 and spaced apart from each other in the left-right direction are provided between the groove 113 and the groove 114 in the left-right direction. The upper wall 172 of the cover wall 171 has a through hole 140A that is continuous with a space between the two protruding pieces 117. The rear wall 173 of the cover wall 171 has a through hole 140B. The lower end of the through hole 140A and the upper end of the through hole 140B are continuous with each other. A first key slot 115 is positioned between the two protruding pieces 117 in each of the slots 108A, 108B, 108C, and 108D. Specifically, the slot 108A has a first key slot 115A, the slot 108B has a first key slot 115B, the slot 108C has a first key slot 115C, and the slot 108D has a first key slot 115D. The first key slot 115 opens upward and rearward. A first key portion 77 (described later) of the ink cartridge 30 is insertable into the first key slot 115.

The first key slots 115A, 115B, 115C, and 115D have different positions in the left-right direction with respect to the groove 113 and the groove 114. Specifically, the first key slot 115A is closer to the groove 113 than the center of the slot 108A between the groove 113 and the groove 114 in the left-right direction. The first key slot 115B is closer to the groove 114 in the slot 108B than the first key slot 115A is to the groove 114 in the slot 108A in the left-right direction. The first key slot 115C is closer to the groove 114 in the slot 108C than the first key slot 115B is to the groove 114 in the slot 108B in the left-right direction. The first key slot 115D is closer to the groove 114 in the slot 108D than the first key slot 115C is to the groove 114 in the slot 108C in the left-right direction.

In each slot 108A, 108B, 108C, and 108D, a rib 118 is positioned above the groove 113 and a rib 119 is positioned above the groove 114. At the slot 108A, the rib 118 protrudes from the inner surface of the right wall 129. At the slot 108B, the rib 118 protrudes from the partition wall 109 defining the right end of the slot 108B. At the slot 108C, the rib 118 protrudes from the partition wall 109 defining the right end of the slot 108C. At the slot 108D, the rib 118 protrudes from the partition wall 109 defining the right end of the slot 108C. At the slot 108A, the rib 119 protrudes from the partition wall 109 defining the left end of the slot 108A. At the slot 108B, the rib 119 protrudes from the partition wall 109 defining the left end of the slot 108B. At the slot 108C, the rib 119 protrudes from the partition wall 109 defining the left end of the slot 108C. At the slot 108D, the rib 119 protrudes from the inner surface of the left wall 128. The ribs 118 and 119 face each other in the left-right direction in each of the slots 108A, 108B, 108C, and 108D.

The supply tube 102 is positioned in the internal space of each of the slots 108A, 108B, 108C, and 108D. The supply tube 102 is positioned below each of the first key slots 115A, 115B, 115C, and 115D. The supply tube 102 has a hollow circular pipe shape. The supply tube 102 extends along the front-rear direction from a sub-tank 120 toward the internal space of each of the slots 108A, 108B, 108C, and 108D. A rear end of the supply tube 102 is opened. The rear end of the supply tube 102 is positioned in the inner space of each of the slots 108A, 108B, 108C, and 108D. Although not described in detail, a valve is disposed in the inner space of the supply tube 102. The valve opens and closes an opening of the supply tube 102. The supply tube 102 is connectable to the supply port 34 of the ink cartridge 30.

As shown in FIG. 1, a front end of the supply tube 102 is connected to the sub-tank 120. The sub-tank 120 has a space that stores the ink supplied from the ink cartridge 30 through the supply tube 102. The internal space of the sub-tank 120 communicates with the outside at the upper portion thereof and is open to the atmosphere. The ink in the sub-tank 120 is supplied to the recording head 21 through the ink tube 20.

As shown in FIG. 2, a rod 121 is positioned above each of the first key slots 115A, 115B, 115C, and 115D. The rod 121 protrudes rearward from the end surface 103. The rod 121 is connectable to an upper valve structure 504 of the ink cartridge 30, which will be described later.

A fitting piece 122 and a fitting piece 123 are positioned above each of the first key slots 115A, 115B, 115C, and 115D and below the rod 121. The fitting piece 122 is a plate-like member. The fitting piece 122 protrudes leftward from the inner surface of the right wall 129 in the slot 108A. The fitting piece 122 protrudes leftward from the partition wall 109 defining the right end of the slot 108B. The fitting piece 122 protrudes leftward from the partition wall 109 defining the right end of the slot 108C. The fitting piece 122 protrudes leftward from the partition wall 109 defining the right end of the slot 108D. The fitting piece 123 is a plate-like member. The fitting piece 123 protrudes rightward from the partition wall 109 defining the left end of the slot 108A. The fitting piece 123 protrudes rightward from the partition wall 109 defining the left end of the slot 108B. The fitting piece 123 protrudes rightward from the partition wall 109 defining the left end of the slot 108C. The fitting piece 123 protrudes rightward from the inner surface of the left wall 128 in the slot 108D. The fitting piece 122 and the fitting piece 123 face each other in the left-right direction in the slot 108.

As shown in FIG. 13, in each of the slots 108A, 108B, 108C, and 108D, contacts 125 are positioned on the upper inner surface of the case body 101. The contacts 125 are electrically connectable to the IC board 60 of the ink cartridge 30. Through the contacts 125, a controller of the printer 10 reads information stored in the IC board 60 of the ink cartridge 30 and records information in the IC board 60.

As shown in FIGS. 13A and 13B, an ink receiving member 130 is positioned in the space 162 of the case body 101. The ink receiving member 130 is provided for each of the slots 108A, 108B, 108C, and 108D. The ink receiving member 130 has a front end portion 131 extending in the left-right direction. The front end portion 131 is supported by the case body 101. The ink receiving member 130 has a substantially flat plate shape extending rearward and upward from the front end portion 131, and a rear end portion 132 of the ink receiving member 130 is positioned in the vicinity of the rear end of the supply tube 102. The ink receiving member 130 rotates about the front end portion 131 so that the rear end portion 132 moves substantially in the up-down direction. A coil spring 133 extending along the front-rear direction is positioned between the ink receiving member 130 and the case body 101. The coil spring 133 urges, i.e., pulls the rear end portion 132 of the ink receiving member 130 frontward.

As shown in FIGS. 13A and 13B, the ink receiving member 130 urged, i.e., pulled by the coil spring 133 is held in a state where the rear end portion 132 is the closest to the lower surface of the supply tube 102. In this state, the rear end portion 132 is not in contact with the lower surface of the supply tube 102. The state where the rear end portion 132 of the ink receiving member 130 is the closest to the lower surface of the supply tube 102 is referred to as a closest state of the ink receiving member 130. In the state where the rear end portion 132 of the ink receiving member 130 is the closest to the lower surface of the supply tube 102, the ink receiving member 130 is positioned at a first position. In a state where the ink cartridge 30 is not attached to the supply tube 102, the ink receiving member 130 is in the closest state but not in contact with the lower surface of the supply tube 102. After the ink cartridge 30 is removed from the case body 101, ink may remain on the rear end of the supply tube 102. Such ink moves to a lower portion of the rear end of the supply tube 102 due to gravity and thereafter drips to the rear end portion 132 of the ink receiving member 130 which is in the closest state to the lower surface of the supply tube 102. The received ink moves along the ink receiving member 130 from the rear end portion 132 toward the front end portion 131 away from the ink cartridge 30. Since the ink that remains on the rear end of the supply tube 102 is received by the rear end portion 132 of the ink receiving member 130, it is possible to reduce the possibility that the ink adheres to the lower wall of the case body 101.

Figure 14A:
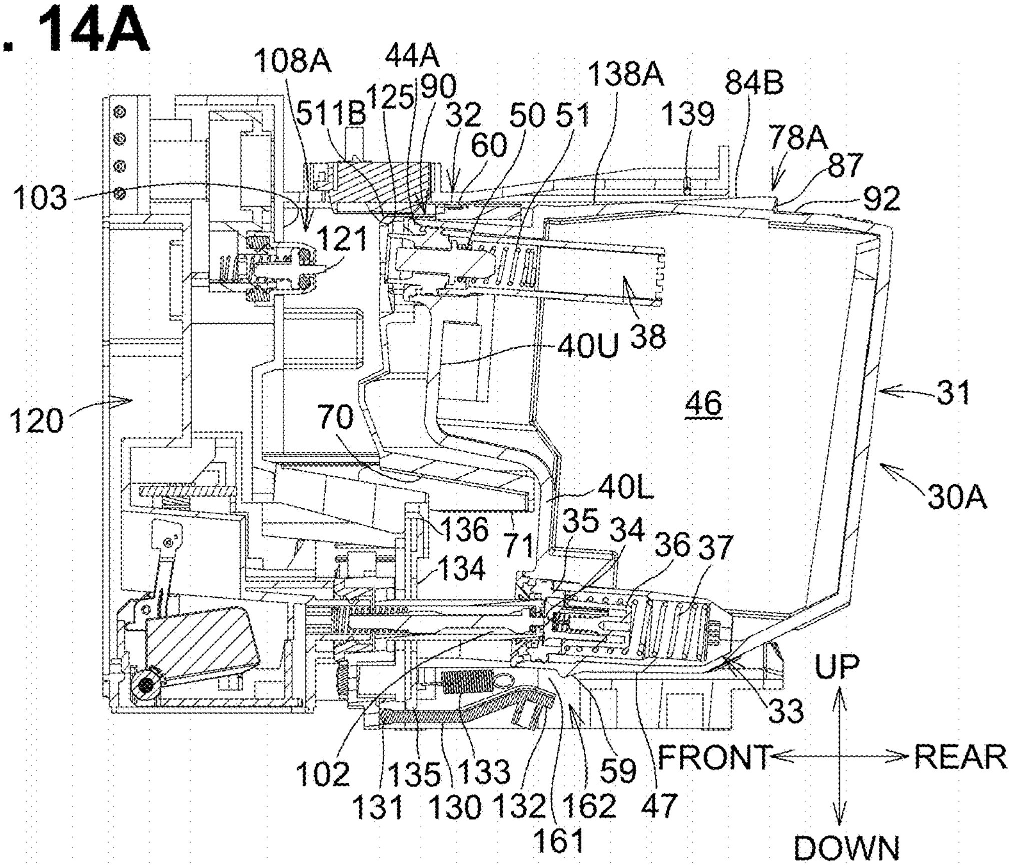
FIGS. 14A and 14B are cross-sectional views of the ink cartridge 30 and the cartridge case 110, each showing a state in which the ink cartridge 30 is positioned in the cartridge case 110 and the ink receiving member 130 is in a second position.
Figure 14B:
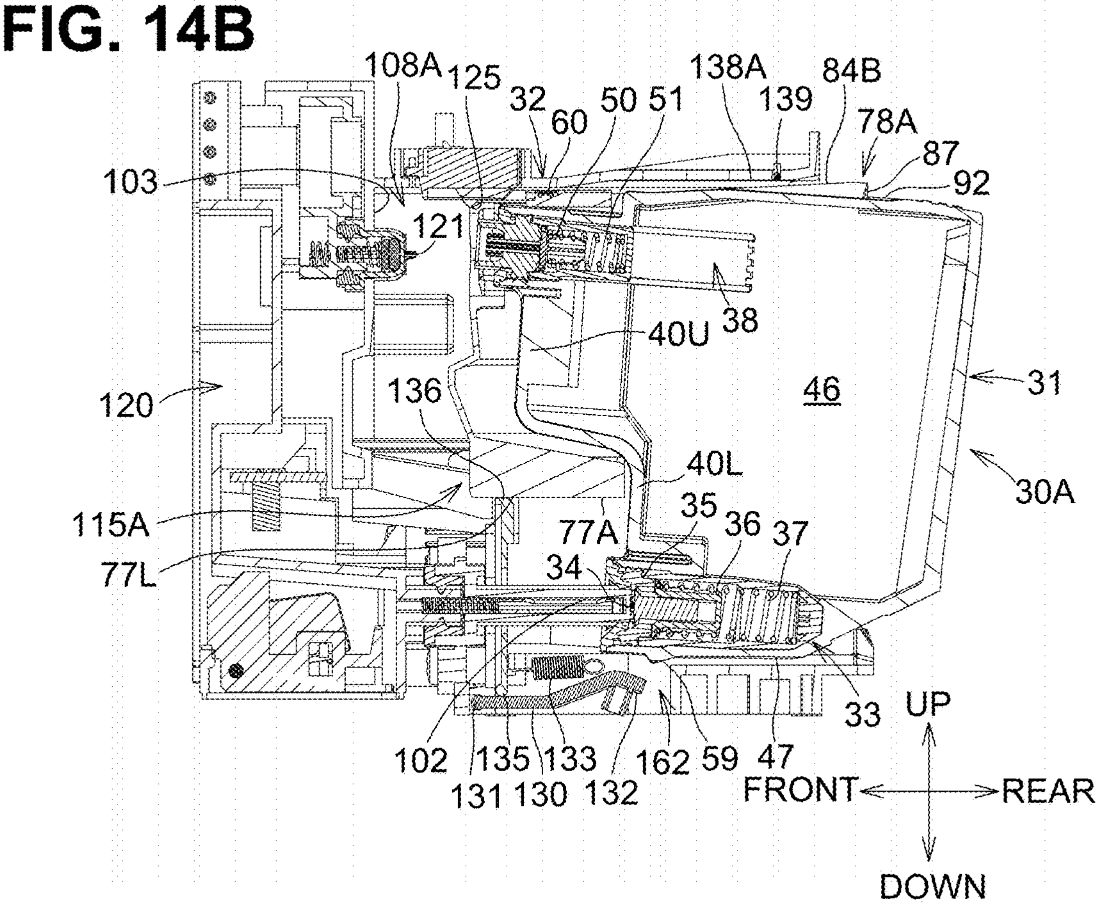

As shown in FIGS. 14A and 14B, in a state where the ink receiving member 130 has moved downward against the pulling force of the coil spring 133, the ink receiving member 130 is in a second position. A space is provided between the ink receiving member 130 at the second position and the supply tube 102 to such an extent that a lower portion of a supply portion 33 of the ink cartridge 30 can be positioned in the space and the supply tube 102 can be received by the supply portion 33. That is, when the supply tube 102 is received in the supply port 34 of the ink cartridge 30 inserted into each of the slots 108A, 108B, 108C, and 108D in the frontward direction, the ink receiving member 130 does not restrict the frontward movement of the ink cartridge 30.

As shown in FIG. 2, the pressing plate 134 is positioned below the cover wall 171 of each of the slots 108A, 108B, 108C, and 108D and in front of the rear wall 173. The pressing plate 134 is supported by the case body 101 so as to be movable in the up-down direction. A lower end 135 of the pressing plate 134 is in contact with the ink receiving member 130 at a portion between the front end portion 131 and the rear end portion 132 of the ink receiving member 130. An upper end 136 of the pressing plate 134 is positioned below the first key slot 115 when the ink cartridge 30 is attached to the cartridge case 110 in the attached state. The pressing plate 134 is positioned below the through hole 140A of the cover wall 171. The pressing plate 134 is positioned in front of the through hole 140B of the rear wall 173. With this configuration, the pressing plate 134 can come into contact with a first key portion 77 of the ink cartridge 30, which will be described later, through the first key slot 115, the through hole 140A, and the through hole 140B. The pressing plate 134 is held at a lifted position by the ink receiving member 130 urged, i.e., pulled by the coil spring 133.

Although details will be described later, when the first key portion 77 of the ink cartridge 30 enters the first key slot 115, the pressing plate 134 is pressed down by the first key portion 77 against the urging, i.e., pulling force of the coil spring 133. When the pressing plate 134 moves downward, the ink receiving member 130 is movable between the first position and the second position.

As shown in FIG. 2, second key slots 138 are arranged at positions corresponding to the respective slots 108A, 108B, 108C, and 108D in a surface 137 positioned on the upper side of the peripheral edge of the case body 101, which defines the opening 112. Specifically, in the case body 101, the slot 108A has a second key slot 138A, the slot 108B has a second key slot 138B, the slot 108C has a second key slot 138C, and the slot 108D has a second key slot 138D. The second key slot 138 is a recess formed in a rear end of a top surface of the case body 101 defining an upper end of the internal space of the case body 101. The second key slot 138 is recessed upward from the top surface. The lower end of the second key slot 138 is continuous with the internal space of the case body 101. A rear end of the second key slot 138 is open toward the outside of the case body 101. A distance between a lower end and an upper end of the opening at the rear end of the second key slot 138 is greater than a distance between a lower end and an upper end of the opening at the front end of the second key slot 138. In the present embodiment, a distance between the lower end and the upper end of the opening of the second key slot 138 gradually decreases from the rear end of the opening toward the front end of the opening. Alternatively, the distance between the lower end and the upper end of the opening of the second key slot 138 may gradually increase and then gradually decrease from the rear end of the opening toward the front end of the opening. The second key slots 138A, 138B, and 138C are respectively positioned to the left of the center of the slots 108A, 108B, and 108C in the left-right direction. The second key slot 138D is positioned to the right of the center of the slot 108D in the left-right direction. A second key portion 78 of the ink cartridge 30 may enter in at least one of the second key slots 138A, 138B, 138C, and 138D.

A locking portion 139 is positioned in a space that defines the opening of each of the second key slots 138A, 138B, 138C, and 138D. The locking portion 139 is a rod-shaped member extending in the left-right direction. The locking portion 139 comes into contact with a locking surface 87 of the ink cartridge 30 when the ink cartridge 30 is attached to the cartridge case 110 in the attached state.

[Ink Cartridge 30]

The ink cartridge 30 is a container in which ink as a liquid is stored. As shown in FIGS. 3 to 10, the ink cartridge 30 includes a main body 31, a cover 32, and an IC board 60. The main body 31 is an example of a first member. The cover is an example of a second member. The main body 31 and the cover are an example of a main body. The lower valve mechanism 12 is an example of a first valve mechanism. The cover 32 covers a front portion of the main body 31. The ink cartridge 30 is inserted frontward into a corresponding one of the slots 108A, 108B, 108C, and 108D with the cover 32 facing the end surface 103 of the case body 101.

The main body 31 has a substantially thin flat cubic shape in which the length in the left-right direction is smaller than the length in the up-down direction and the length in the front-rear direction. The main body 31 includes a supply portion 33, a first key portion 77, and a second key portion 78.

The main body 31 includes a front wall 40, a rear wall 41 opposed to the front wall 40 in the front-rear direction, a left wall 42 connecting the front wall 40 and the rear wall 41, a right wall 43 opposed to the left wall 42 in the left-right direction, an upper wall 44 connecting the front wall 40 and the rear wall 41, and a lower wall 45 opposed to the upper wall 44 in the up-down direction. The main body 31 has an upper surface 80 which is an outer surface of the upper wall 44. The outer surface of the front wall 40 faces frontward. The rear wall 41 has a rear surface 62 facing rearward. The outer surface of the left wall 42 faces leftward. The outer surface of the right wall 43 faces rightward. The outer surface of the upper wall 44, i.e., the upper surface 80 faces upward. The outer surface of the lower wall 45 faces downward.

As shown in FIG. 13, the front wall 40, the rear wall 41, the left wall 42, the right wall 43, the upper wall 44, and the lower wall 45 define a chamber 46 in the internal space of the main body 31. Each of the front wall 40, the rear wall 41, the left wall 42, the right wall 43, the upper wall 44, and the lower wall 45 is an example of a partition wall. The front wall 40, the rear wall 41, the left wall 42, the right wall 43, the upper wall 44, and the lower wall 45 have translucency to the extent that the liquid level of the ink stored in the chamber 46 can be visually recognized from the outside. The main body 31 is, for example, an integrally molded product made of a synthetic resin.

The front wall 40 has an upper front wall 40U positioned on the upper side and a lower front wall 40L positioned on the lower side. An upper end of the upper front wall 40U is continuous with a front end of the upper wall 44. The upper front wall 40U is positioned frontward of the lower front wall 40L in the front-rear direction. A space behind the upper front wall 40U in the front-rear direction is also a part of the chamber 46. In other words, the upper portion of the chamber 46 extends further frontward than the lower portion of the chamber 46. The lower front wall 40L is continuous with the supply portion 33.

Figure 5:
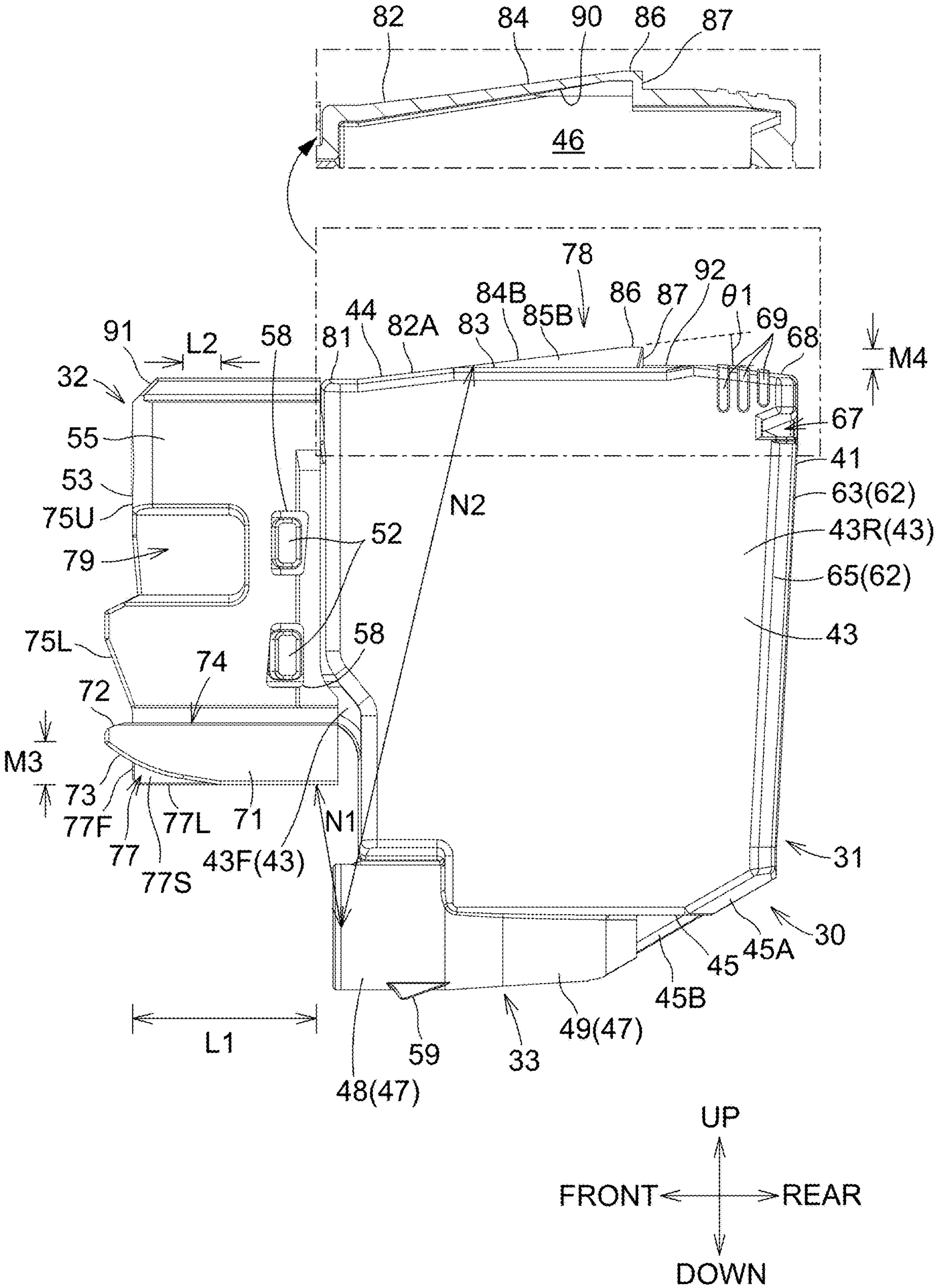
FIG. 5 is a right side view of the ink cartridge 30.
Figure 10:
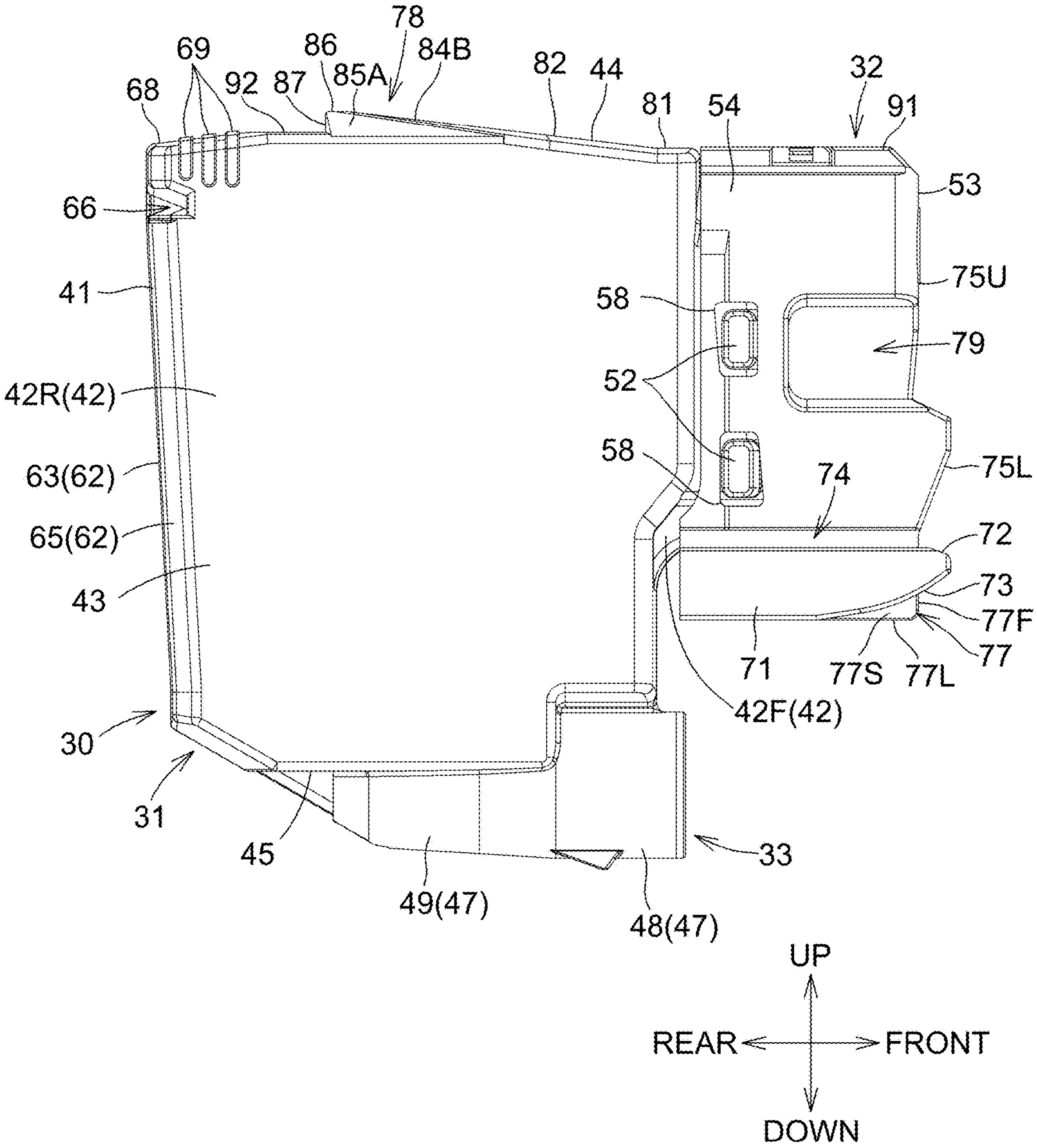
FIG. 10 is a left side view of the ink cartridge 30.

As shown in FIG. 10, the left wall 42 includes a front left wall 42F positioned on the front side in the front-rear direction and a rear left wall 42R positioned on the rear side in the front-rear direction. As shown in FIG. 5, the right wall 43 includes a front right wall 43F positioned on the front side in the front-rear direction and a rear right wall 43R positioned on the rear side in the front-rear direction. The front left wall 42F and the front right wall 43F are continuous with the upper front wall 40U. The rear left wall 42R and the rear right wall 43R are continuous with the rear wall 41. A space between the front left wall 42F and the front right wall 43F is a part of the chamber 46. A distance in the left-right direction between an outer surface of the front left wall 42F and an outer surface of the front right wall 43F is smaller than a distance in the left-right direction between an outer surface of the rear left wall 42R and an outer surface of the rear right wall 43R.

The protrusions 52 are located at two positions on the front left wall 42F. The front right wall 43F has two protrusions 52. The two protrusions 52 are separated from each other in the up-down direction on the front left wall 42F. The two protrusions 52 are separated from each other in the up-down direction on the front right wall 43F. The protrusion 52 is rectangular in a side view. The protrusion 52 enters a through hole 76 of the cover 32 described later.

Figure 3:
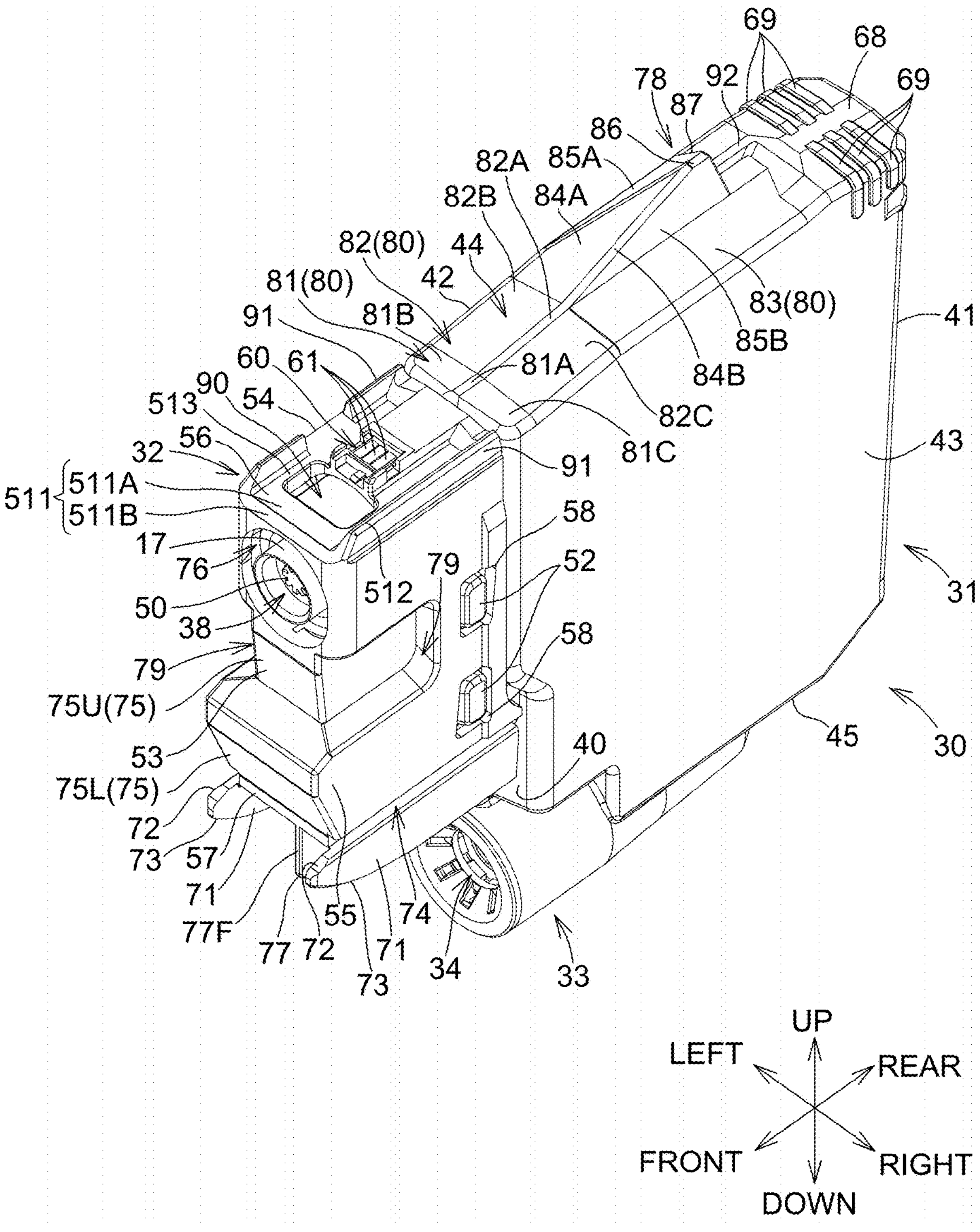
FIG. 3 is a perspective view of an ink cartridge 30 as viewed from the front and above.
Figure 4:
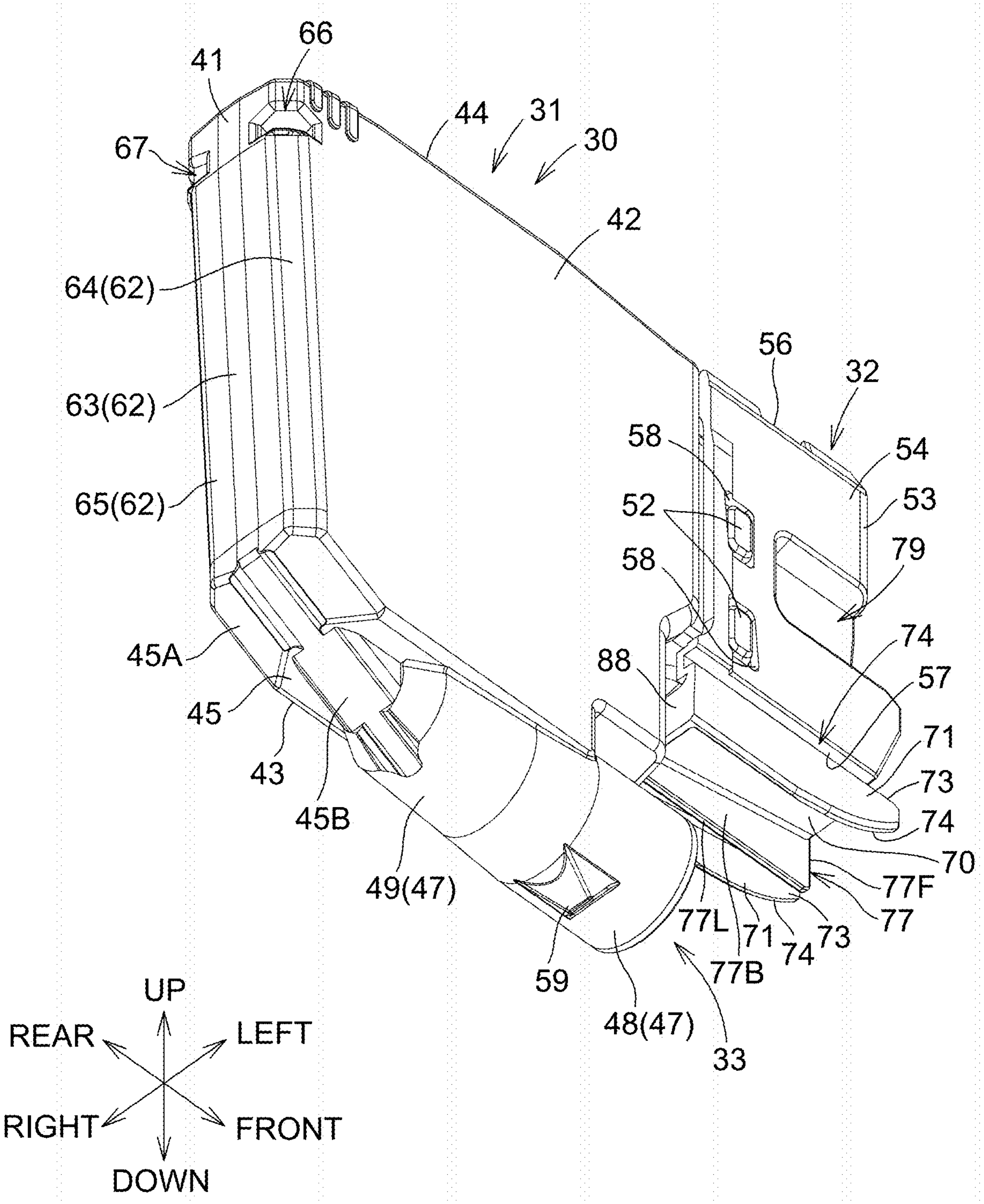
FIG. 4 is a perspective view of the ink cartridge 30 as viewed from the rear and below.

As shown in FIGS. 3 and 4, the supply portion 33 is a cylindrical member. The supply portion 33 has an outer peripheral surface extending in the front-rear direction. The outer peripheral surface is a curved surface curved in a circumferential direction with the front-rear direction as an axis. The supply portion 33 is positioned at a lower end of the main body 31, and a part of an outer surface of the supply portion 33 constitutes a lower surface 47 of the main body 31. The supply portion 33 has a supply port 34 through which the ink flows out of the ink cartridge 30. The supply port is positioned at the front end of the supply portion 33. The supply port 34 is circular when viewed from the front.

The lower surface 47 includes a lower half of a circumferential surface having an axis in the front-rear direction. The lower surface 47 includes a first surface 48 having a cylindrical shape in the front-rear direction and a second surface 49 positioned rearward of the first surface 48 in the front-rear direction. The outer diameter of the supply portion 33 decreases from the first surface 48 toward the second surface 49.

As shown in FIG. 13, the supply portion 33 has a cylindrical shape and has an internal space. The internal space of the supply portion 33 communicates with the supply port 34 at the front in the front-rear direction and communicates with the chamber 46 at the rear in the front-rear direction. A seal member 35, a valve 36, and a coil spring 37 are located in the internal space of the supply portion 33. The seal member 35 is an annular member made of an elastic member, for example, rubber, and is located around the supply port 34 in the internal space of the supply portion 33. The valve 36 is movable in the front-rear direction in the internal space of the supply portion 33. The supply port 34 is sealed by the valve 36 contacting with the seal member 35. The coil spring 37 biases the valve 36 toward the seal member 35.

When the supply tube 102 is received in the supply port 34, the supply tube 102 moves the valve 36 rearward against the urging force of the coil spring 37. When the valve 36 moves rearward, the internal space of the supply portion 33 and the internal space of the supply tube 102 communicate with each other, and the ink in the chamber 46 flows into the internal space of the supply tube 102 through the internal space of the supply portion 33. The seal member 35 is in liquid-tight contact with the outer surface of the supply tube 102.

As shown in FIG. 4, a protrusion 59 protruding downward is positioned on the first surface 48 of the supply portion 33. As shown in FIG. 7, an outline of a portion where the protrusion 59 is continuous with the first surface 48 has a substantially square shape when viewed upward from below in the up-down direction, and a length of the outline in the front-rear direction is substantially equal to a length of the outline in the left-right direction. Both side surfaces of the protrusion 59 in the left-right direction are downward triangles. Each side surface of the protrusion 59 in the left-right direction is a tapered surface that is inclined toward the center of the protrusion 59 in the left-right direction as the side surface extends downward. In other words, the protrusion 59 has a tapered shape in which the length in the left-right direction gradually decreases as the side surface extends downward.

As shown in FIG. 13, the upper front wall 40U of the main body 31 has an atmosphere communication path 502 that has a cylindrical shape and defines an atmosphere communication path 501 that connects the vicinity of the upper end of the chamber 46 and the outside. The atmosphere communication path 502 extends rearward from the atmosphere communication path 501. The atmosphere communication path 501 is positioned frontward of the supply port 34 in the front-rear direction. The atmosphere communication path 501 is open frontward in the upper front surface 40U.

Figure 19:
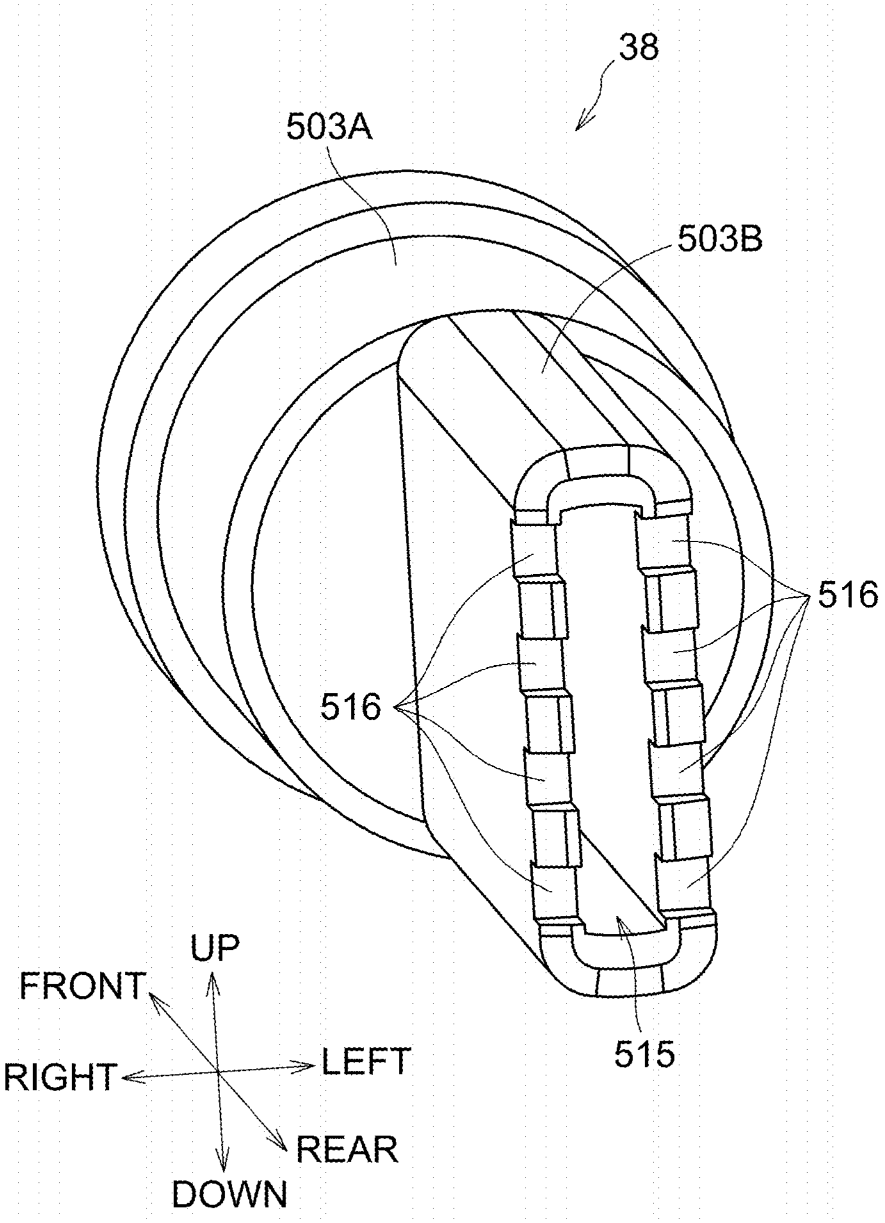
FIG. 19 is a perspective view of a support member 38.

A support member 38 that has a substantially cylindrical shape is positioned in the atmosphere communication path 502. The support member 38 is inserted into the internal space of the atmosphere communication path 502 through the atmosphere communication path 501. The support member 38 is in pressure contact with the inner peripheral surface of the atmosphere communication path 502. As shown in FIGS. 13 and 19, the support member 38 has a cylindrical main body portion 503A having a cylindrical shape and a rectangular tube portion 503B having a rectangular tube shape. The inner peripheral surface of the cylindrical main body portion 503A defines a circular air flow path. The rectangular tube portion 503B extends rearward from the rear end of the cylindrical main body portion 503A. The inner space of the rectangular tube portion 503B communicates with the inner space of the cylindrical main body portion 503A. The inner peripheral surface of the rectangular tube 503B defines a rectangular air flow path that is longer in the up-down direction than in the left-right direction. A cross-sectional area of the air flow path of the rectangular tube portion 503B cut by a plane orthogonal to the front-rear direction is smaller than a cross-sectional area of the air flow path of the cylindrical body portion 503A cut by a plane orthogonal to the front-rear direction. The rear end of the rectangular tube portion 503B defines an opening 515 that opens rearward. The opening 515 has a rectangular shape that is longer in the up-down direction than in the left-right direction. The rectangular tube portion 503B has a plurality of recesses 516 recessed forward from the rear end of the rectangular tube portion 503B. The plurality of recesses 516 are positioned at equal intervals in the up-down direction. Accordingly, the formation of a meniscus of ink in the opening 515 is suppressed.

The valve mechanism 504 is positioned in the internal space of the support member 38. The support member 38 supports the valve mechanism 504. The valve mechanism 504 includes a valve seat 17, a valve 50, and a coil spring 51.

The valve seat 17 is located at the atmosphere communication port 501. The valve seat 17 is fitted into the inner peripheral surface of the atmosphere communication portion 502. The valve seat 17 has an annular shape. The valve seat 17 has a through hole 17A extending in the front-rear direction. The rear end of the valve seat 17 is in contact with the front end of the support member 38.

The valve 50 includes a columnar portion 50A having a cylindrical shape and an extending portion 50B. The columnar portion 50A is inserted into the through hole 17A of the valve seat 17 so as to be movable in the front-rear direction. The extending portion 50B extends outward in the radial direction from the outer peripheral surface of the columnar portion 50A. The outer diameter of the columnar portion 50A is smaller than the inner diameter of the through hole 17A. Thus, a gap through which air can flow is provided between the outer peripheral surface of the columnar portion 50A and the inner circumferential surface of the through hole 17A. The front end of the columnar portion 50A is located forward of the through hole 17A. The rear end of the columnar portion 50A is located rearward of the through hole 17A. The extending portion 50B has an annular shape extending over the entire circumference of the outer peripheral surface of the columnar portion 50A in the circumferential direction. The front surface of the extending portion 50B is in contact with the rear end of the valve seat 17.

The coil spring 51 is positioned in the internal space of the support member 38. The front end of the coil spring 51 is positioned above and forward of the supply port 34 of the supply portion 33. The front end of the coil spring 51 is positioned forward of the second key portion 78. The coil spring 51 biases the valve 50 forward. The front end of the coil spring 51 is in contact with the rear surface of the extending portion 50B of the valve 50. The rear end of the coil spring 51 is supported by the inner circumferential surface of the support member 38. Thus, the front surface of the extending portion 50B is pressed against the rear end of the valve seat 17. As a result, the atmosphere communication path 501 is sealed. As will be described in detail later, when the valve 50 moves rearward against the urging force of the coil spring 51, the atmosphere communication path 501 is opened, and air can flow between the outside and the chamber 46.

The cover 32 has a substantially quadrangular parallelepiped shape whose length in the up-down direction and length in the front-rear direction are smaller than a length in the up-down direction and a length in the front-rear direction of the main body 31. The cover 32 has a box shape having an opening facing rearward. The cover 32 is attached to the main body 31 so as to substantially cover the upper front wall 40U, the front of the upper wall 44, the front left wall 42F, and the front right wall 43F.

The cover 32 includes a front wall 53, a left wall 54 extending rearward from a left end of the front wall 53, a right wall 55 opposed to the left wall 54 in the left-right direction, an upper wall 56 extending rearward from an upper end of the front wall 53, and a lower wall 57 opposed to the upper wall 56 in the up-down direction. The front wall 53, the left wall 54, the right wall 55, the upper wall 56, and the lower wall 57 define an internal space of the cover 32. The opening of the cover 32 is defined by rear ends of the front wall 53, the left wall 54, the right wall 55, the upper wall 56, and the lower wall 57.

The front wall 53 is a part of the front wall of the ink cartridge 30. The front wall 53 is an example of a first wall. The left wall 54 is a part of the left wall of the ink cartridge 30. The left wall 54 is an example of a third wall. The right wall 55 is a part of the right wall of the ink cartridge 30. The right wall 55 is an example of a second wall. The upper wall 56 is a part of the upper wall of the ink cartridge 30. The upper wall 56 is an example of a fourth wall. The lower wall 57 is a part of the lower wall of the ink cartridge 30.

The length of the cover 32 in the up-down direction is smaller than the length of the main body 31 in the up-down direction. The length of the cover 32 in the front-rear direction is smaller than the length of the main body 31 in the front-rear direction. The distance of the cover 32 in the left-right direction is slightly greater than the distance between the outer surface of the front left wall 42F and the outer surface of the front right wall 43F of the main body 31 in the left-right direction, and is substantially the same as the distance between the outer surface of the rear left wall 42R and the outer surface of the rear right wall 43R in the left-right direction.

The left wall 54 has two through holes 58 spaced apart in the up-down direction. The right wall 55 has two through holes 58 spaced apart in the up-down direction. The protrusions 52 on the front left wall 42F are positioned in the through holes 58 of the left wall 54, and the protrusions 52 on the front right wall 43F are positioned in the through holes 58 of the right wall 55. The through hole 58 has a substantially quadrangular shape. Specifically, the length of each through hole 58 in the up-down direction is greater than the length thereof in the front-rear direction. The through hole 58 is sufficiently larger than the outer shape of the protrusion 52. That is, the length of each through hole 58 in the up-down direction is greater than the length of each protrusion 52 in the up-down direction. The length of each through hole 58 in the front-rear direction is greater than the length of each protrusion 52 in the front-rear direction. The main body 31 and the cover 32 are assembled by inserting the protrusions 52 into the corresponding through holes 58. Since the through hole 58 is larger than the outer shape of the protrusion 52, the cover 32 is relatively movable in the up-down direction and the front-rear direction with respect to the main body 31 in a state where the main body 31 and the cover 32 are assembled. Since the through hole 58 is sufficiently larger than the outer shape of the protrusion 52, the cover 32 can move relative to the main body 31 not only in the up-down direction and the front-rear direction, but also in a direction in which the cover 32 rotates relative to the main body 31 along a plane extending in the up-down direction and the front-rear direction.

The cover 32 covers the upper front wall 40U of the main body 31, the front side of the upper wall 42F, the front left wall 42F, and the front right wall 43F in the state in which the cover 32 is attached to the main body 31. The front wall 53 of the cover 32 is positioned frontward of the supply port 34. The supply port 34 is positioned below the lower wall 57 of the cover 32.

The IC board 60 is positioned on the upper wall 56 of the cover 32. The IC board 60 extends in the front-rear direction and the left-right direction. The IC board 60 is positioned above the supply port 34. The IC board 60 includes a substrate formed of, for example, silicone or glass epoxy, an IC mounted on the substrate and three electrodes 61 mounted on the substrate. Note that the IC does not appear in the drawings. Three electrodes 61 face upward. The IC board 60 may be a flexible substrate having flexibility.

The IC board 60 is bonded to the upper wall 56 of the cover 32 by, for example, a photocurable resin. The IC board 60 may be bonded to the cover 32 by an adhesive other than the photocurable resin, or may be attached to the cover 32 by fitting or the like other than bonding.

The electrodes 61 of the IC board 60 come into contact with the contacts 125 in the process in which the ink cartridge 30 is inserted into the cartridge case 110. In the attached state where the ink cartridge 30 is attached to the cartridge case 110, the IC board 60 is in contact with and electrically connected to the contacts 125.

The IC is a semiconductor integrated circuit. Information related to the ink cartridge 30 is readably stored in the IC. The information related to the ink cartridge 30 is, for example, data indicating information such as a lot number, a manufacturing date, and an ink color.

The electrode 61 is electrically connected to the IC. The electrode 61 extends in the front-rear direction. The electrodes 61 are arranged on the upper surface of the IC board 60 so as to be spaced apart from each other in the left-right direction. The electrode 61 is exposed on the upper surface of the IC board 60 so as to be electrically accessible. The IC board 60 is an example of an electrical interface.

Figure 6:
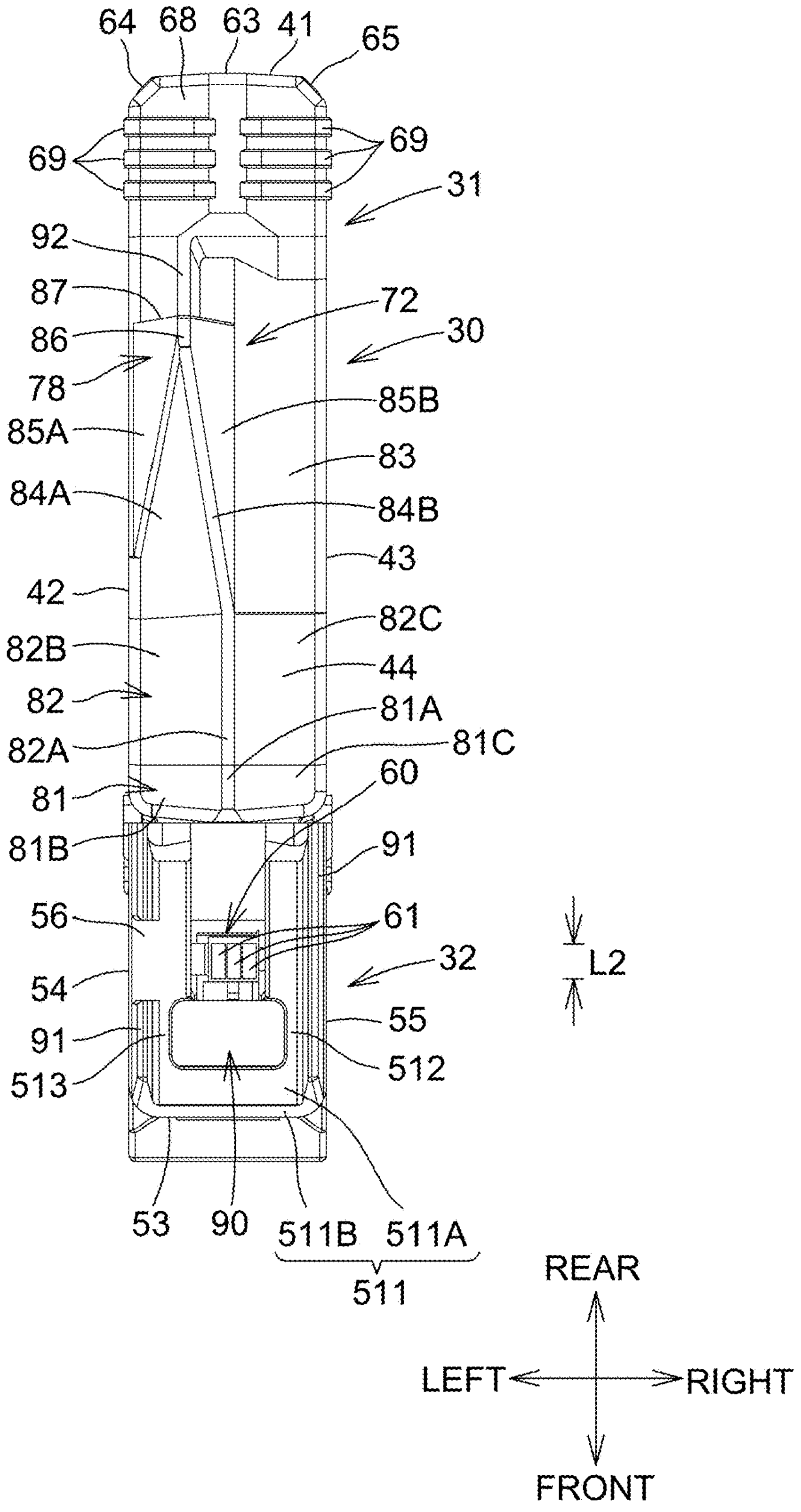
FIG. 6 is a plan view of the ink cartridge 30.

As shown in FIGS. 3 and 6, the upper wall 56 of the cover 32 has a through hole 90 in front of the IC board 60. The through hole 90 has a rectangle shape and is longer in the left-right direction than in the front-rear direction when viewed from above. The upper wall 56 has a front portion 511 that defines a front end of the through hole 90, a right portion 512 that defines a right end of the through hole 90, and a left portion 513 that defines a left end of the through hole 90.

The right end of the front portion 511 is continuous with the upper end of the right wall 55. The left end of the front portion 511 is continuous with the upper end of the left wall 54. The front portion 511 has an upper surface 511A that faces upwardly and an inclined surface 511B. The upper surface 511A is adjacent to the front of the through hole 90. The inclined surface 511B is adjacent to the front of the upper surface 511A. The inclined surface 511B extends from the right end to the left end of the upper surface 511A. The front end of the inclined surface 511B is continuous with the upper end of the front surface of the front wall 53 over the entire length in the left-right direction. The inclined surface 511B is inclined with respect to the upper surface 511A so as to extend downward toward the front. The front portion 511 is an example of a front end portion.

The right portion 512 extends rearward from a right end portion of the rear end of the front portion 511. The right portion 512 extends from the rear end of the front portion 511 to the rear end of the through hole 90 in the front-rear direction. The right portion 512 extends leftward from an upper end of the right wall 55. The left end of the right portion 512 defines the right end of the through hole. The right portion 512 is an example of a first portion.

The left portion 513 extends rearward from a left end portion of the rear end of the front portion 511. The left portion 513 extends from the rear end of the front portion 511 to the rear end of the through hole 90 in the front-rear direction. The left portion 513 extends rightward from an upper end of the left wall 54. The right end of the left portion 513 defines the left end of the through hole 90. The left portion 513 is an example of a second portion.

As shown in FIG. 13, a front end 44A of the upper wall 44 of the main body 31 is positioned below the through hole 90. The support member 38 is positioned below the through hole 90. Guide pieces 91 extending in the front-rear direction protrude upward from the upper wall 56 of the cover 32 in the vicinity of both ends in the left-right direction. The right guide piece 91 extends from the upper surface 511A of the front portion 511 of the upper wall 56 toward the rear end of the upper wall 56. The right guide piece 91 is an example of a first protrusion. The left guide piece 91 extends from the upper surface 511A of the front portion 511 of the front portion 511 of the upper wall 56 toward the rear end of the upper wall 56 except for a central portion in the front-rear direction. The left guide piece 91 is an example of a second protrusion. The IC board 60 is positioned between the right guide piece 91 and the left guide piece 91 in the left-right direction. The left and right guide pieces 91 function as guides for the cover 32 to move in the front-rear direction when the cover 32 is inserted into the cartridge case 110.

As shown in FIG. 7, a lower surface 70 which is an outer surface of the lower wall 57 of the cover 32 is positioned above and frontward of the supply port 34. The lower surface 70 is a flat surface extending rearward from the lower end of the front wall 53, and is inclined so as to extend downward toward the rear.

The cover 32 has walls 71 extending downward from both ends of the lower surface 70 in the left-right direction. The one wall 71 and the other wall 71 are spaced apart from each other in the left-right direction. The wall 71 is a plate-like member extending in the up-down direction and the front-rear direction and having a thickness in the left-right direction. The length of the wall 71 in the front-rear direction is greater than the length of the wall 71 in the left-right direction and the length of the wall 71 in the up-down direction. The length of the wall 71 in the up-down direction is greater than the length thereof in the left-right direction. As shown in FIG. 5, the front surface of the wall 71 has a first front surface 72 positioned at an upper portion thereof and a second front surface 73 positioned at a lower portion thereof. A front end of the first front surface 72 is inclined so as to extend upward as the front end of the first front surface 72 extends toward the rear. The second front surface 73 is inclined so as to extend downward as the front end of the second front surface 73 extends toward the rear.

As shown in FIG. 7, the rear ends of the two walls 71 contact with a sub-front wall 88 (also referred to as a wall), and the two walls 71 extend frontward from the sub-front wall 88. The sub-front wall 88 extends downward from the rear end of the lower surface 70. The sub-front wall 88 has a plate shape extending in the up-down direction and the left-right direction and having a thickness in the front-rear direction. The length of the sub-front wall 88 in the left-right direction is greater than the length thereof in the up-down direction. The outer surface of the sub-front wall 88 facing frontward is a part of the front surface of the cover 32.

In the left wall 54 of the cover 32, a groove 74 (also referred to as a first groove 74) extending in the front-rear direction is positioned above the wall 71. The first groove 74 is positioned leftward and upward of the first key portion 77 and extends in the front-rear direction. In the right wall 55 of the cover 32, a groove 74 (also referred to as a second groove 74) extending in the front-rear direction is positioned above the wall 71. The second groove 74 is positioned rightward and upward of the first key portion 77 and extends in the front-rear direction. A longitudinal direction of the groove 74 is the front-rear direction. As shown in FIG. 8, the groove 74 is defined by a surface 74L facing upward, a surface 74U facing the surface 74L in the up-down direction, and a surface 74M connecting the surface 74L and the surface 74U. The front end of the groove 74 is open frontward in the front wall 53 of the cover 32. That is, the first groove 74 has an opening at a front end and a left end, and the second groove has an opening at a front end and a right end. As shown in FIGS. 3 to 10, the first front surface 72 of the one wall 71 serves as a guide for guiding the rib 118 of the cartridge case 110 into the one groove 74. The first front surface 72 of the other wall 71 serves as a guide for guiding the rib 119 of the cartridge case 110 into the first groove 74. One of the grooves 74 has a length capable of receiving the rib 118 of the case body 101 in the front-rear direction, and the other groove 74 has a length capable of receiving the rib 119 of the case body 101 in the front-rear direction. Specifically, the distance between the surface 74L and the surface 74U of the groove 74 in the up-down direction is greater than each of the lengths of the rib 118 and the rib 119 of the case body 101 in the up-down direction. The position of the cover 32 with respect to the case body 101 in the up-down direction is determined by the contact of the surface 74U and the surface 74L of one of the grooves 74 with the rib 118 and by the contact of the surface 74U and the surface 74L of one of the grooves 74 with the rib 119.

The outer surface of the front wall 53 of the cover 32 is a front surface 75. The front surface 75 is positioned frontward of the supply port 34. The front surface 75 has an upper front surface 75U positioned at an upper portion thereof and a lower front surface 75L positioned at a lower portion thereof. The upper end of the lower front surface 75L is continuous with the upper front surface 75U. The lower end of the lower front surface 75L is positioned rearward of the upper end of the lower front surface 75L, and the lower front surface 75L is inclined upward as the lower front surface 75L extends toward the front. The lower front surface 75L is a guide for guiding the rib 118 and the rib 119 into the groove 74. Specifically, in the process in which the ink cartridge 30 is inserted into the case 110, the lower front surface 75L comes into contact with the front end of the rib 118 and the front end of the rib 119. In this configuration, the lower front surface 75L guides each of the rib 118 and the rib 119 to the groove 74.

The upper front surface 75U of the front wall 53 of the cover 32 has a through hole 76. The front end of the through hole 76 is positioned forward of the supply port 34 of the supply portion 33. The upper end of the through hole 76 is close to the upper end of the front wall 53. The through hole 76 faces the atmosphere communication path 501 of the main body 31 in the front-rear direction. The front end of the valve seat 17 of the main body 31 is located in the through hole 76. The valve seat 17 and the valve 50 of the main body 31 are exposed to the outside through the through hole 76. The through hole 76 is an example of a second through hole.

The lower surface 70 of the cover 32 has a first key portion 77. The first key portion 77 is positioned above the supply port 34 and below the upper surface of the electrode 61 of the IC board 60. The front end of the first key portion 77 is positioned frontward of the front end of the electrode 61. The first key portion 77 is positioned below the through hole 76. In other words, the atmosphere communication path 501 of the atmosphere communication path 502 is positioned between the first key portion 77 and the electrode 61 in the up-down direction. The first key portion 77 is positioned at a front part of the ink cartridge 30.

As shown in FIG. 8, the first key portion 77 is positioned between the pair of walls 71 in the left-right direction and extends downward from the lower surface 70. A rear end of the wall 71 is continuous with the sub-front wall 88. A rear end of the first key portion 77 is continuous with the sub-front wall 88. The first key portion 77 has a lower surface 77L defining a lower end of the first key portion 77, side surfaces 77S, and a front surface 77F defining a front end of the first key portion 77. Each of the side surfaces 77S of the first key portion 77 extends along the up-down direction and the front-rear direction.

The lower surface 77L of the first key portion 77 extends along the front-rear direction and left-right direction. The lower surface 77L defines the width of the first key portion 77 in the left-right direction. In the present embodiment, the first key portion 77 has a plate shape in which the length in the front-rear direction is greater than the length in each of the left-right direction and the length in the up-down direction, however the shape of the first key portion 77 is not limited thereto. For example, the length of the first key portion 77 in the front-rear direction may be smaller than the length thereof in the up-down direction. The lower surface 77L is a position overlapping at least one of the electrodes 61 in the up-down direction. In other words, the lower surface 77L is positioned directly below at least one of the electrodes 61 in the up-down direction. As shown in FIG. 5, the length L1 of the lower surfaces 77L in the front-rear direction is greater than the length L2 of the upper surface of the electrodes 61 in the front-rear direction. The front surface 77F of the first key portion 77 faces frontward. The front surface 77F is positioned rearward of the front end of the first front surface 72 of the wall 71. The first front surface 72 is positioned rearward of the front end of the second front surface 73. Further, the front surface 77F of the first key portion 77 is positioned rearward of the front end of the front wall 53 of the cover 32. Thus, in a case where the ink cartridge 30 is dropped with the front wall 53 of the cover 32 facing downward, even when the first front surface 72 or the second front surface 73 of the wall 71 or the front end of the front wall 53 of the cover 32 collides with a floor or the like, the front surface 77F of the first key portion 77 does not collide with the floor or the like. Therefore, the first key portion 77 is less likely to be deformed by a direct impact. On a related note, as will be described later, the first key portion 77 functions as a key to ensure that the ink cartridge 30 is attached to the right slot 108. When the first key portion 77 is deformed, the first key portion 77 may not correctly function as a key.

Figure 11:
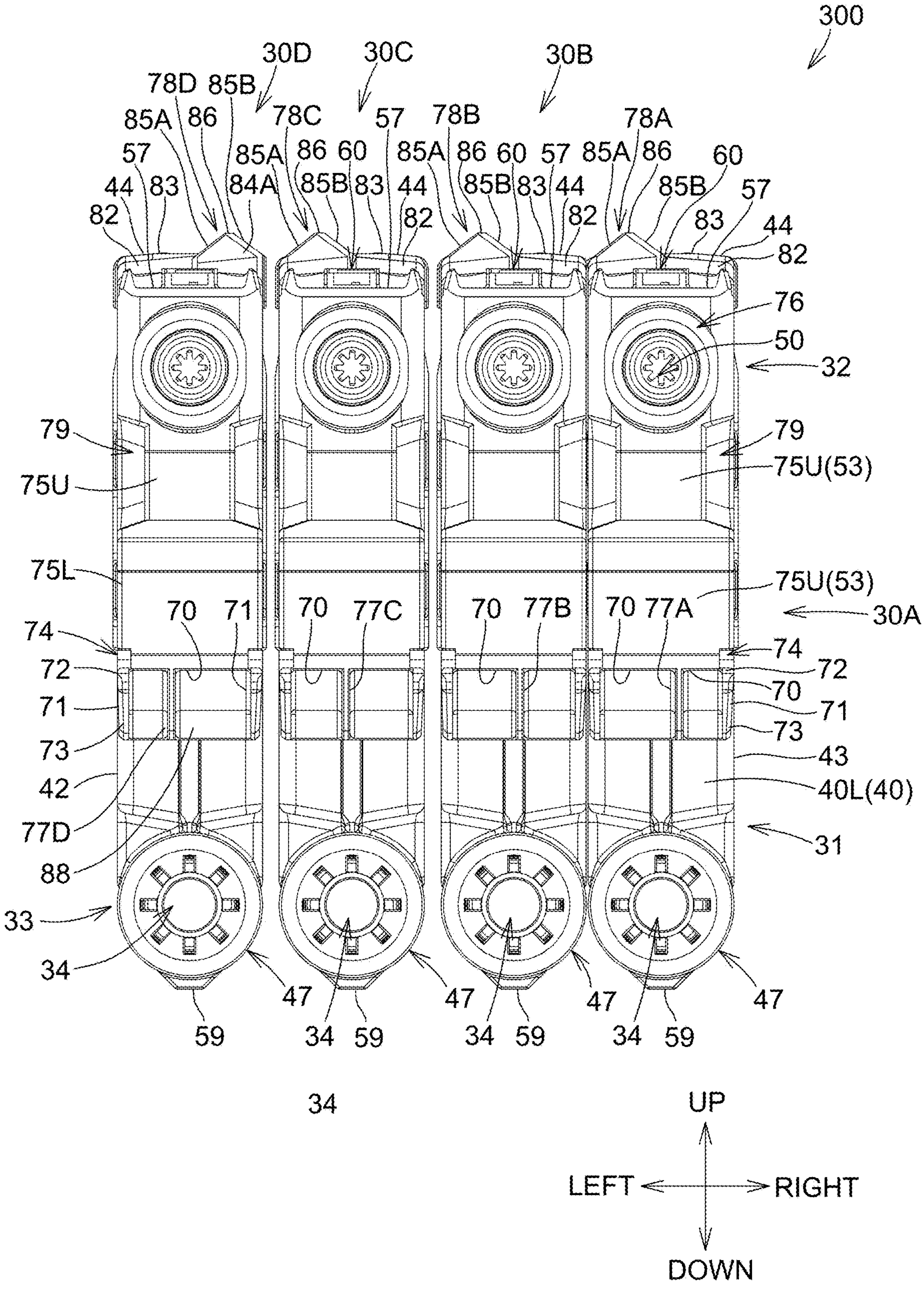
FIG. 11 is a front view of four ink cartridges 30.

As shown in FIG. 11, the first key portions 77 are assigned to the respective slots 108A, 108B, 108C, and 108D in accordance with the characteristics of the ink cartridges 30 to be mounted. The mechanical characteristics of the first key portion 77 such as the arrangement and the shape are different. The position of the first key portion 77 in the left-right direction varies depending on the characteristics of the ink stored in the chamber 46. The characteristics of the ink are, for example, the color and composition of the ink.

The cover 32 includes a third key portion 79. The third key portion 79 is defined by a recessed portion recessed from the left wall 54 of the cover 32, a recessed portion recessed from the right wall 55, a protrusion protruding leftward from the left wall 54, or a protrusion protruding rightward from the right wall 55. In the present embodiment, the third key portion 79 includes a recessed portion that is recessed from the left wall 54 of the cover 32 and a recessed portion that is recessed from the right wall 55. As shown in FIG. 8, the third key portion 79 is a combination of the recessed portion of the left wall 54 and the recessed portion of the right wall 55. The third key portion 79 is positioned above the first key portion 77 and below the upper surface of the electrode 61 of the IC board 60. In this embodiment, the third key portion 79 is positioned below the through hole 76. The third key portion 79 is positioned at both ends of the upper front surface 75U in the left-right direction. The front end of the third key portion 79 is opened frontward in the upper front surface 75U of the cover 32. That is, both of the recessed portion of the left wall 54 and the recessed portion of the right wall 55 are opened frontward in the upper front surface 75U of the cover 32.

Depending on the characteristic of each ink cartridge 30, the mechanical characteristic such as the position and shape of the third key portion 79 is different. The characteristic of the ink cartridge 30 indicated by the third key portion 79 may be the same as or different from the characteristic of the ink cartridge 30 indicated by the first key portion 77. In the present embodiment, the characteristic of the ink cartridge 30 indicated by the first key portion 77 is the color of the ink, and the characteristic of the ink cartridge 30 indicated by the third key portion 79 is the type of contract that a user will enter into when using a printer in which the ink cartridge 30 is used. The type of contract may include a contract in which a user is charged in accordance with the number of pages on which image recording is performed regardless of the amount of ink used. As long as this contract is concluded, a new ink cartridge 30 is delivered when the ink in the chamber 46 of the ink cartridge 30 is consumed, but the user does not have to pay for the ink cartridge 30 itself. Alternatively, the characteristic of the ink cartridge 30 indicated by the third key portion 79 is a sales area of the printer in which the ink cartridge 30 is used. The shape of the third key portion 79 of the ink cartridge 30 used in a certain sales area is different from the shape of the third key portion 79 of the ink cartridge 30 used in another sales area. For example, the third key portion 79 may be disposed only on one of the left and right sides, or the shape of the third key portion 79 opening frontward may be different depending on the contract type or the sales area. The presence or absence and the shape of the fitting piece 122 and the fitting piece 123 of the cartridge case 110 are different in accordance with the presence or absence and the shape of the third key portion 79.

Figure 9:
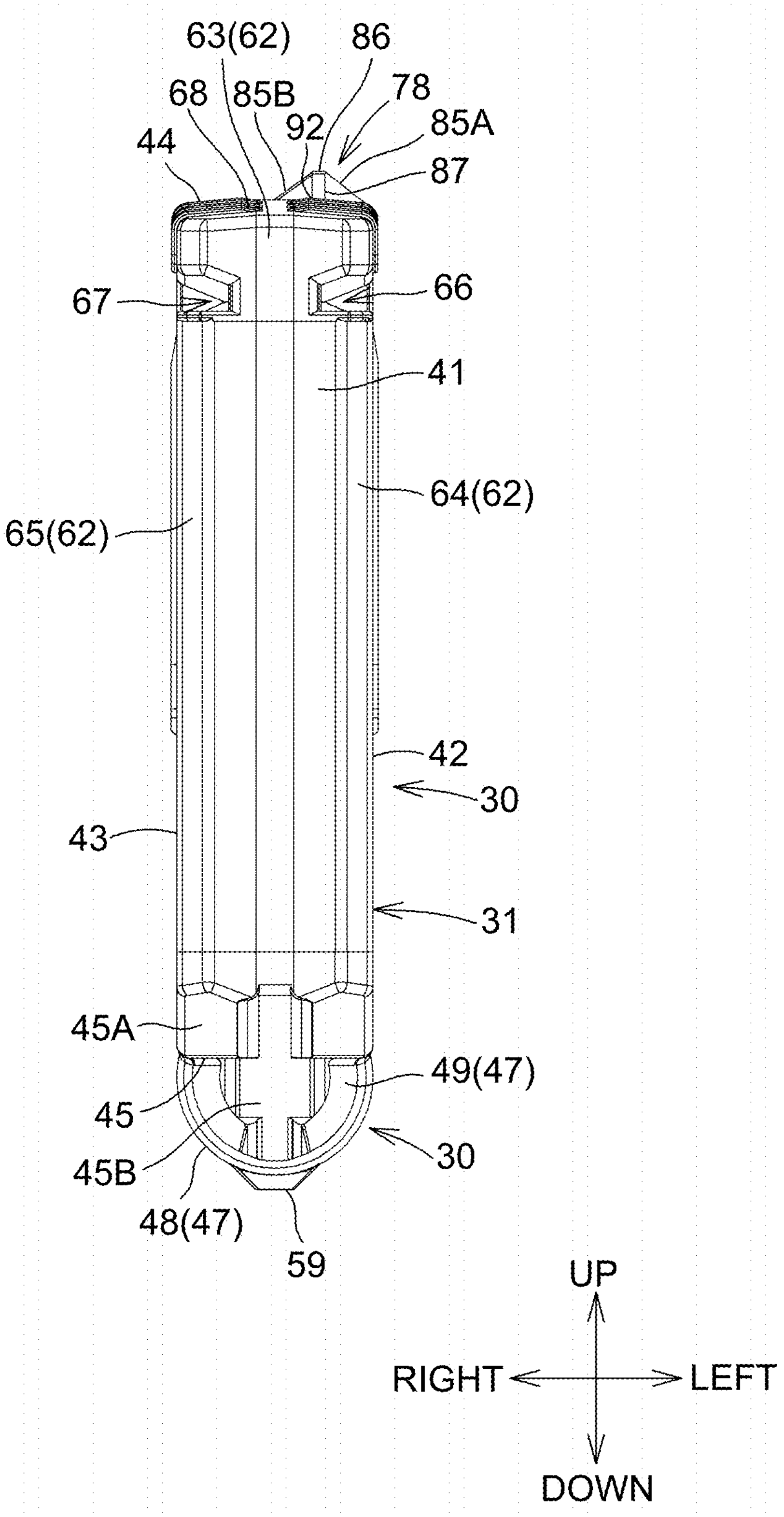
FIG. 9 is a rear view of the ink cartridge 30.

As shown in FIG. 9, the main body 31 has a rear surface 62 as an outer surface of the rear wall 41 of the main body 31. The rear surface 62 includes a first rear surface 63, a second rear surface 64, and a third rear surface 65. The second rear surface 64 is positioned on the left of the first rear surface 63. The third rear surface 65 is positioned on the right of the first rear surface 63. The first rear surface 63 is a flat surface orthogonal to the front-rear direction. The second rear surface 64 is a plane intersecting with the front-rear direction and the right-left direction. The right end of the second rear surface 64 is continuous with the first rear surface 63. The left end of the second rear surface 64 is positioned leftward and rearward of the first rear surface 63. The third rear surface 65 is a plane intersecting with the front-rear direction and the left-right direction. The left end of the third rear surface 65 is continuous with the first rear surface 63. The right end of the third rear surface 65 is positioned rightward and rearward of the first rear surface 63. The length of the first rear surface 63 in the left-right direction is constant in the up-down direction.

As shown in FIGS. 4, 5 and 9, the lower wall 45 of the main body 31 includes a first lower wall 45A and a second lower wall 45B. A rear end of the first lower wall 45A is continuous with a lower end of the rear wall 41. A front portion of the first lower wall 45A extends in the front-rear direction. A front end of the first lower wall 45A is continuous with the front wall 40. The supply portion 33 is positioned on the first lower wall 45A. The curved front surface of the supply portion 33 including the rear end of the supply portion 33 protrudes downward from the first lower wall 45A.

The second lower wall 45B is continuous with the lower end of the rear wall 41. The second lower wall 45B is an inclined wall inclined with respect to the front-rear direction. The second lower wall 45B is inclined with respect to the front-rear direction and the up-down direction such that an upper end of the second lower wall 45B is positioned rearward and upward of a lower end thereof. The lower end of the second lower wall 45B is continuous with the rear end of the lower surface 47 of the supply portion 33. The lower end of the second lower wall 45B is continuous with the rear end of the supply portion 33 in a position below the first lower wall 45A. The second lower wall 45B is shorter than the first lower wall 45A in the left-right direction.

Since the supply portion 33 is positioned below the first lower wall 45A, as shown in FIG. 9, the lower surface 47 of the supply portion 33 is visible when the ink cartridge 30 is viewed from the rear. Therefore, it is possible for the user to recognize where the supply portion 33 is when viewed from the rear, and it is easy to attach the ink cartridge 30 in the correct orientation when the ink cartridge 30 is attached to the slot 108. In addition, since the lower wall 45 is continuous with the rear end of the supply portion 33, the rear end of the supply portion 33 is reinforced. As a result, even if the lower end of the ink cartridge 30 receives an impact, the supply portion 33 is less likely to be deformed. Note that the lower wall 45 may have only the first lower wall 45A without the second lower wall 45B.

The second rear surface 64 has a recess 66 near the upper end. The recess 66 is constituted by a space recessed frontward from the second rear surface 64 and a surface defining the space. The third rear surface 65 has a recess 67 near the upper end. The recess 67 is constituted by a space recessed frontward from the third rear surface 65 and a surface defining the space. As shown in FIG. 1, a protrusion 127 protruding from the cover 126 is accommodated in each of the recesses 66 and 67 when the cover 126 is closed. The protrusion 127 of the cover 126 in the closed state is in contact with the surface forming the upper end of the recesses 66 and 67. With this configuration, the ink cartridge 30 attached to the cartridge case 110 is less likely to be detached from the cartridge case 110 due to an impact or the like. Further, as shown in FIG. 9, a length in the left-right direction of the first rear surface 63 sandwiched between the recess 66 and the recess 67 is greater than a length in the left-right direction of the recess 66 and greater than a length in the left-right direction of the recess 67. Thus, since the first rear surface 63 is easily visible from the rear of the ink cartridge 30, the user is more likely to press an upper portion of the first rear surface 63 when attaching the ink cartridge 30 to the cartridge case 110.

Figure 12:
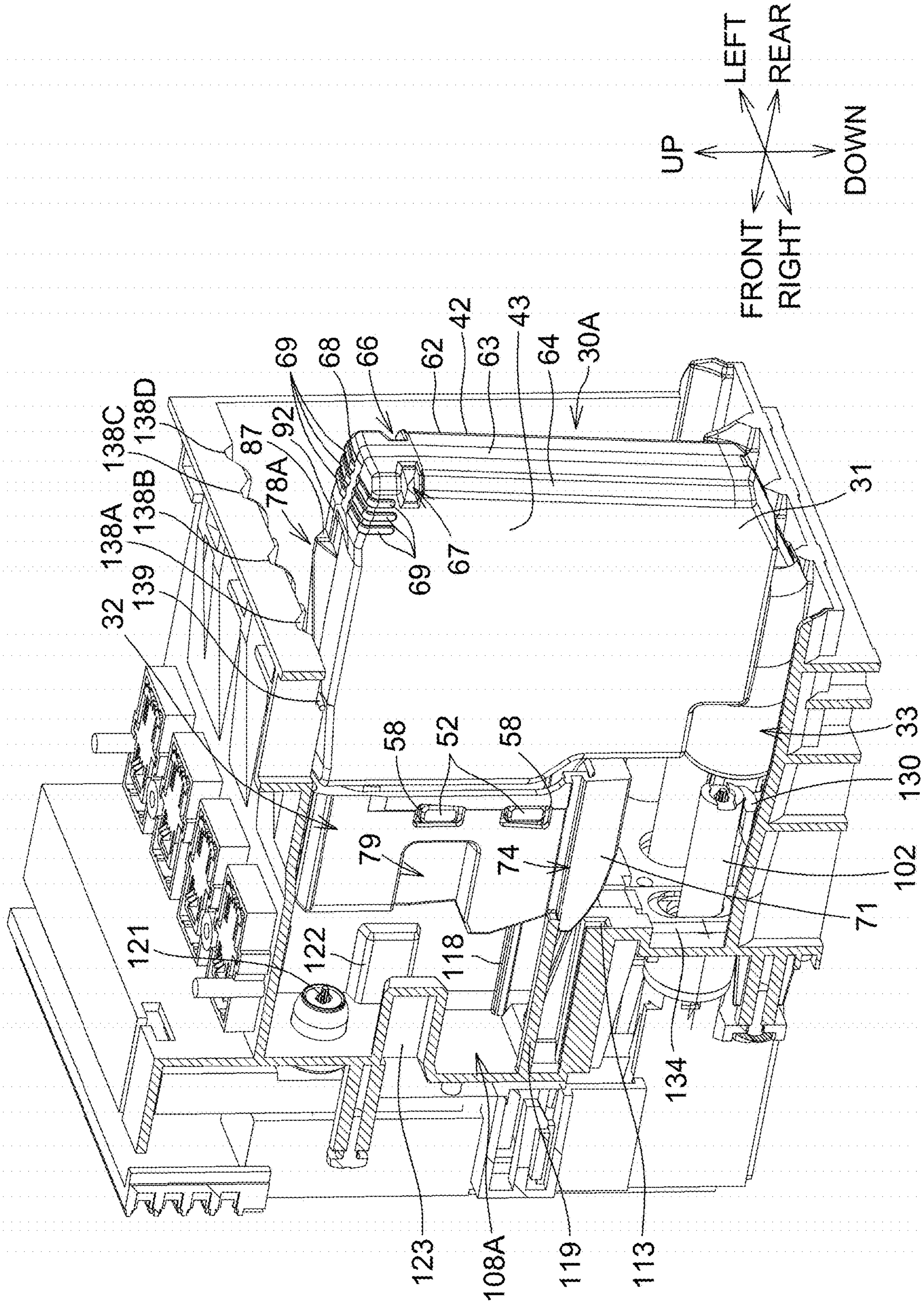
FIG. 12 is a partial cross-sectional perspective view of the ink cartridge 30 and the cartridge case 110, showing a state where the ink cartridge 30 is being inserted into the cartridge case 110.

As shown in FIGS. 9 and 10, the rear end of the upper surface 80 of the upper wall 44 of the main body 31 includes an operation surface 68. The operation surface 68 is an inclined surface inclined so as to face upward and rearward. The operation surface 68 is continuous with the upper end of the rear surface 62. The operation surface 68 has a plurality of protrusions 69 that protrude upward and extend along the left-right direction. As shown in FIG. 12, the protrusions 69 extend downward from both ends of the operation surface 68 in the left-right direction so as to reach the outer surfaces of the left wall 42 and the right wall 43. Three protrusions 69 extend from the left end of the operation surface 68 to the left wall 42 so as to be spaced apart in the front-rear direction. Three protrusions 69 extend from the right end of the operation surface 68 to the right wall 43 so as to be spaced apart in the front-rear direction. The protrusions 69 function as a slip stopper when the user operates the operation surface 68. Note that the slip stopper may be, for example, a recess recessed downward from the operation surface 68 instead of the protrusion 69.

The upper surface 80 of the main body 31 includes a first upper surface 81, a second upper surface 82, a third upper surface 83, an upper end surface 86, and the operation surface 68.

The first upper surface 81 is positioned at a front end of the upper surface 80. As shown in FIGS. 3 and 6, the first upper surface 81 has a surface 81A positioned at the center in the left-right direction, a surface 81B positioned on the left, and a surface 81C positioned on the right. The surface 81A is a plane orthogonal to the up-down direction. The surface 81B is continuous with the left end of the surface 81A. The surface 81C is continuous with the right end of the surface 81A. The surface 81B is a surface facing upward and leftward. The surface 81C is a surface facing upward and rightward. The length of the surface 81A in the left-right direction is smaller than the length of the surface 81B in the left-right direction. The length of the surface 81A in the left-right direction is smaller than the length of the surface 81C in the left-right direction.

The second upper surface 82 is continuous with the rear end of the first upper surface 81. The rear end of the second upper surface 82 is positioned higher than the front end thereof. The second upper surface 82 has a surface 82A positioned at the center in the left-right direction, a surface 82B positioned on the left of the surface 82A, and a surface 82C positioned on the right of the surface 82A. As shown in FIGS. 5 and 10, the surface 82A is inclined with respect to the front-rear direction so as to face frontward and upward. The surface 82A is a flat surface extending in the front-rear direction and the left-right direction. The surface 82A faces upward and frontward. The surface 82B is continuous with the left end of the surface 82A and faces leftward. The surface 82C is continuous with the right end of the surface 82A and faces rightward. The length of the surface 82A in the left-right direction is smaller than the length of the surface 82B in the left-right direction. The length of the surface 82A in the left-right direction is smaller than the length of the surface 82C in the left-right direction. The length of the surface 82A in the left-right direction is equal to the length of the surface 81A in the left-right direction. The length of the surface 82A in the front-rear direction is greater than the length of the surface 81A in the front-rear direction.

The third upper surface 83 is continuous with the rear end of the surface 82C of the second upper surface 82. The third upper surface 83 is a plane orthogonal to the up-down direction. The third upper surface 83 is positioned above the first upper surface 81. A rear end of the third upper surface 83 is continuous with the operation surface 68. The third upper surface 83 has a contact surface 92. The contact surface 92 extends rearward from a lower end of a locking surface 87 of a second key portion 78 described later.

As shown in FIGS. 5 and 6, the second key portion 78 is positioned on the third upper surface 83 of the main body 31. The second key portion 78 protrudes upward from the third upper surface 83. The second key portion 78 is positioned above the supply port 34. An upper end of the second key portion 78 is positioned above the upper surface of the electrode 61 of the IC board 60. The second key portion 78 is positioned rearward of the IC board 60 in the front-rear direction. The second key portion 78 is positioned frontward of the operation surface 68. When the protrusion 52 of the main body 31 is in contact with the upper end of the through hole 58 of the cover 32, the cover 32 is positioned at the lowest position with respect to the main body 31. In a state where the cover 32 is positioned at the lowest position with respect to the main body 31, the upper end of the second key portion 78 is positioned above the IC board 60.

The second key portion 78 has a first frontward inclined surface 84A, a second frontward inclined surface 84B, a left inclined surface 85A, a right inclined surface 85B, an upper end surface 86, and a locking surface 87. The first frontward inclined surface 84A is a flat surface and is inclined such that a distance with regard to the supply port 34 in the up-down direction gradually increases from a front end of the second key portion 78 toward a rear end of the second key portion 78. The first frontward inclined surface 84A is continuous with the rear end of the surface 82B of the second upper surface 82. The second frontward inclined surface 84B is a flat surface inclined with respect to the front-rear direction so as to face upward and frontward. The second frontward inclined surface 84B extends leftward as the second frontward inclined surface 84B extends rearward from the front end thereof. The rear end of the second frontward inclined surface 84B is continuous with the upper end surface 86. The front end of the second frontward inclined surface 84B is continuous with the rear end of the surface 82A of the second upper surface 82. The lower end of the second frontward inclined surface 84B is continuous with the third upper surface 83. The left end of the second frontward inclined surface 84B is continuous with the right end of the first frontward inclined surface 84A. A boundary between the first frontward inclined surface 84A and the second frontward inclined surface 84B extends leftward from the front end toward the rear. An upper end of the boundary between the first frontward inclined surface 84A and the second frontward inclined surface 84B is continuous with the upper end surface 86.

The upper end surface 86 is a flat surface facing upward. An upper end of the locking surface 87 is continuous with a rear end of the upper end surface 86. In other words, the upper end surface 86 is positioned between the second frontward inclined surface 84B and the locking surface 87 in the front-rear direction. The locking surface 87 is a flat surface facing rearward. In the attached state where the ink cartridge 30 is attached to the cartridge case 110, the locking surface 87 and the contact surface 92 are in contact with the locking portion 139 of the cartridge case 110.

The left inclined surface 85A is a flat surface inclined with respect to the left-right direction so as to extend upward from the left end toward the right end. The left inclined surface 85A is continuous with a left end of the first frontward inclined surface 84A. A boundary between the left inclined surface 85A and the first frontward inclined surface 84A extends rightward from the front end toward the rear end. A rear end of the boundary between the left inclined surface 85A and the first frontward inclined surface 84A is continuous with the upper end surface 86. The upper end of the left inclined surface 85A is continuous with the upper end surface 86. The rear end of the left inclined surface 85A is continuous with the locking surface 87. The right inclined surface 85B is a flat surface that is inclined with respect to the left-right direction so as to extend upward from the right end toward the left end. The right inclined surface 85B is continuous with the right end of the second frontward inclined surface 84B. A boundary between the right inclined surface 85B and the second frontward inclined surface 84B extends leftward from the front end toward the rear end. A rear end of the boundary between the right inclined surface 85B and the second frontward inclined surface 84B is continuous with the upper end surface 86. The rear end of the right inclined surface 85B is continuous with the locking surface 87. Since the second key portion 78 has the first frontward inclined surface 84A, the second frontward inclined surface 84B, the left inclined surface 85A, and the right inclined surface 85B, the strength of the second key portion 78 is higher than in a case where the second key portion 78 has a surface extending in the up-down direction. Therefore, the second key portion 78 is not easily deformed by an impact from the right and left direction.

As shown in FIGS. 5 and 8, a first angle θ1 formed between the second frontward inclined surface 84B and a horizontal plane is smaller than a second angle θ2 formed between the left inclined surface 85A and a horizontal plane. A third angle θ3 formed between the right inclined surface 85B and a horizontal plane may be different from the second angle θ2 formed between the left inclined surface 85A and a horizontal plane. The first angle θ1 is, for example, within a range of 5° to 10°, and is 7° in the present embodiment. The second angle θ2 is, for example, within a range of 30° to 40°. The third angle θ3 is, for example, within a range of 30° to 40°.

The mechanical characteristics of the second key portion 78, such as the arrangement and shape, differ depending on the characteristics of each ink cartridge 30. The characteristics indicated by the second key portion 78 may be the same as or different from the characteristics indicated by the first key portion 77 and the third key portion 79. In the present embodiment, the characteristic of the ink cartridge 30 indicated by the second key portion 78 is the composition of the ink. The position of the second key portion 78 in the left-right direction on the second upper surface 82 varies depending on the composition of the ink. The composition of the ink means a material contained in the ink, for example, whether a coloring material contained in the ink is a black dye or a black pigment.

As shown in FIG. 8, a length M1 of the first key portion 77 in the left-right direction is smaller than a length M2 of the second key portion 78 in the left-right direction, that is, a maximum width of the second key portion 78 in the left-right direction. As shown in FIG. 5, a length M3 of the front end of the first key portion 77 in the up-down direction is greater than the length M4 of the second key portion 78 in the up-down direction, that is, a maximum height of the second key portion 78 in the up-down direction. The length M4 corresponds to a length of the locking surface 87 of the second key portion 78 in the up-down direction. The maximum height of the second key portion 78 in the up-down direction is less than the maximum width of the second key portion 78 in the left-right direction.

As shown in FIG. 5, a first distance N1, which is the shortest distance between the center of the supply port 34 and the first key portion 77, is smaller than a second distance N2, which is the shortest distance between the center of the supply port 34 and the second key portion 78. With such a configuration, as will be described later, when the rear end of the main body 31 is rotated upward about the supply port 34, the length of the trajectory of rotation of the first key portion 77 is smaller than the length of the trajectory of rotation of the second key portion 78.

As shown in FIG. 11, an ink cartridge set 300 includes a plurality of ink cartridges 30. The ink cartridges 30 included in the ink cartridge set 300 have different mechanical characteristics such as the position and/or the shape of the first key portion 77, the second key portion 78, and the third key portion 79 depending on the difference in the characteristics of the ink cartridges 30. The positions of the first key portions 77 of the four ink cartridges 30 in the left-right direction are different depending on the colors of the inks stored in the ink cartridges 30. The positions of the second key portions 78 of the four ink cartridges 30 in the left-right direction are different depending on the compositions of the inks stored in the ink cartridges 30. In this specific embodiment, the composition of the ink means whether the ink contains a dye or a pigment. The positions and/or shapes of the third key portions 79 of the four ink cartridges 30 are different depending on the sales areas of the printers in which the cartridges 30 are used. The ink cartridge 30A in FIG. 11 corresponds to the ink cartridge 30 illustrated in FIGS. 3 to 10.

The position of the first key portion 77 in the left-right direction corresponds to the position of the first key slot 115 of the cartridge case 110. The first key portion 77 of the ink cartridge 77A, which is positioned on the rightmost side in FIG. 11, is positioned to the right of the center of the ink cartridge 30A in the left-right direction on the lower surface 70. The ink cartridge 30A stores a magenta ink which contains a dye as a coloring agent. The first key portion 77B of the ink cartridge 30B, which is positioned second from the right in FIG. 11, is positioned further to the left than the first key portion 77A of the ink cartridge 30A in the left-right direction on the lower surface 70. The ink cartridge 30B stores a cyan ink which contains a dye as a coloring agent. The first key portion 77C of the ink cartridge 30C, which is positioned third from the right in FIG. 11, is positioned further to the left than the first key portion 77B of the ink cartridge 30B in the left-right direction on the lower surface 70. The ink cartridge 30C stores a yellow ink which contains a dye as a coloring agent. The first key portion 77D of the ink cartridge 30D, which is positioned on the leftmost side in FIG. 11, is positioned further to the left than the first key portion 77C of the ink cartridge 30C in the left-right direction on the lower surface 70. The ink cartridge 30D stores a black ink which contains a pigment as a coloring agent.

The positions in the left-right direction of the second key portions 78A, 78B, 78C, and 78D of the ink cartridges 30A, 30B, 30C, and 30D correspond to the positions of the respective second key slots 138 of the cartridge case 110. Each of the second key portions 78A, 78B, and 78C of the ink cartridges 30A, 30B, and 30C is positioned further leftward than the center of the second upper surface 82 in the left-right direction. The second key portion 78D of the ink cartridge 30D is positioned to the right of the center of the second upper surface 82 in the left-right direction. In the present embodiment, since the four ink cartridges 30 shown in FIG. 11 are used in the same sales area, the positions and shapes of the third key portions 79 are the same.

[Attachment of Ink Cartridge 30 to Cartridge Case 110]

As shown in FIG. 12, the ink cartridge 30 is inserted into a predetermined slot 108 of the cartridge case 110 in the frontward direction. In other words, the ink cartridge 30 is inserted such that the front wall 53 of the ink cartridge 30 faces the end surface 103 of the case body 101. The ink cartridges 30A, 30B, 30C, and 30D storing magenta, cyan, yellow, and black inks, respectively are inserted into the four slots 108A, 108B, 108C, and 108D, respectively. Hereinafter, an example in which an ink cartridge 30A storing magenta ink is inserted into the rightmost slot 108A in the left-right direction will be described. The ink cartridge 30A storing magenta ink is positioned at the rightmost position in FIG. 11. The user pushes the first rear surface 63 of the ink cartridge 30A frontward with the finger and inserts the ink cartridge 30A frontward into the cartridge case 110.

As shown in FIGS. 13A and 13B, the ink cartridge 30A is inserted into the slot 108A through the opening 112 of the case body 101. The lower surface 47 of the inserted ink cartridge 30A is supported by the guide surface 161 of the case body 101 shown in FIG. 2.

Before the supply port 34 of the ink cartridge 30A reaches the supply tube 102, the second key portion 78A reaches a position directly below the second key slot 138A of the case body 101. The second key portion 78A of the ink cartridge 30A is positioned on the left with respect to the center of the second upper surface 82 in the left-right direction. On the other hand, the second key slot 138A is positioned on the left with respect to the center of the slot 108A in the left-right direction. Therefore, when the ink cartridge 30A is further inserted frontward, as shown in FIGS. 14A and 14B, the second key portion 78A moves directly below the second key slot 138A. At this time, the inclined surface 511B of the front portion 511 of the cover 32 comes into contact with the contact 125 of the case body 101 in the forward direction, and the second forward inclined surface 84B of the second key portion 78A comes into contact with the lock portion 139, whereby a downward force is applied to the ink cartridge 30A. When the downward force is applied to the inclined surface 511B of the front portion 511 of the cover 32 and the second forward inclined surface 84B of the second key portion 78A, the cover 32 moves downward and the main body 31 rotates clockwise in FIGS. 14A and 14B. As a result, the lower surface 47 of the supply portion 33, which defines the lower end of the ink cartridge 30, comes into contact with the guide surface 161 of the case body 101, and the second key portion 78A moves forward while contacting the lock portion 139, and reaches a position below the second key slot 138A. At this time, the cover 32 moves downward while the main body 31 rotates clockwise, and therefore, the front end 44A of the upper wall 44 of the main body 31 approaches the lower surface of the upper wall 56 of the cover 32. However, since the front end 44A of the upper wall 44 of the main body 31 is positioned below the through hole 90 of the upper wall 56, the main body 31 is prevented from coming into contact with the upper wall 56 by the through hole 90. The front end 44A of the upper wall 44 of the main body 31 is an example of a portion that is an upper end and a front end of the partition wall.

Further, the first key portion 77A enters the first key slot 115A in a state where the supply portion 33 is in contact with the guide surface 161 of the case body 101 and the second frontward inclined surface 84B of the second key portion 78A is in contact with the locking portion 139.

Further, one of the pair of walls 71 enters the groove 113. The other one of the pair of walls 71 enters the groove 114. Further, the rib 118 enters one of the two grooves 74. The rib 119 enters the other one of the two grooves 74. One of the pair of walls 71 enters the groove 113, and the other enters the groove 114, whereby the cover 32 is guided frontward. When the rib 118 enters one of the two grooves 74 and the rib 119 enters the other one of the two grooves 74, the cover 32 is positioned with respect to the cartridge case 110 in the up-down direction. In other words, the position of the cover 32 with respect to the cartridge case 110 in the up-down direction is determined.

The second front surface 73 of the one of the pair of walls 71 moves frontward while being in contact with the lower surface of the groove 113 and the second front surface 73 of the other one of the pair of walls 71 moves frontward while being in contact with the lower surface of the groove 114, whereby one of the walls 71 is guided into the groove 113 and the other is guided into the groove 114 in the up-down direction. Further, when the first front surface 72 of one of the walls 71 or the lower front surface 75L of the cover 32 comes in contact with the rib 118 as the ink cartridge 30A moves frontward, the rib 118 is guided into the groove 74 in the up-down direction. When the first front surface 72 of the other one of the walls 71 or the lower front surface 75L of the cover 32 comes in contact with the rib 119 as the ink cartridge 30A moves frontward, the rib 119 is guided into the groove 74 in the up-down direction. In addition, when the first key portion 77A of the ink cartridge 30A enters the first key slot 115A, the side surfaces 77S of the first key portion 77A shown in FIGS. 4 and 8 moves frontward while being into contact with the pair of protruding pieces 117, and thus the first key portion 77A is guided into the first key slot 115A in the left-right direction.

While the first key portion 77A of the ink cartridge 30A enters the first key slot 115A, the second key portion 78A enters the second key slot 138A. In addition, while the second key portion 78A enters the second key slot 138A, the second frontward inclined surface 84B and the upper end surface 86 sequentially come into contact with the locking portion 139. As shown in FIGS. 14A and 14B, a downward and rearward force acts on the main body 31 in a state where the second frontward inclined surface 84B is in contact with the locking portion 139, and a downward force acts on the main body 31 in a state where the upper end surface 86 is in contact with the main body 31. When the second frontward inclined surface 84B or the upper end surface 86 slides on the locking portion 139, the lower surface 47 of the main body 31 slides on the guide surface 161.

When the first key portion 77A of the ink cartridge 30A enters the first key slot 115A, the lower surface 77L of the first key portion 77A comes into contact with the upper end 136 of the pressing plate 134. When the first key portion 77A of the ink cartridge 30A enters the first key slot 115A, the lower surface 77L of the first key portion 77A presses the pressing plate 134 downward to move the ink receiving member 130 from the first position to the second position. When this occurs, an upward force originated from the urging, i.e., pulling force of the coil spring 133 acts on the cover 32 via the ink receiving member 130 and the pressing plate 134, but the surfaces 74L and 74U of the groove 74 shown in FIG. 8 is in contact with the rib 118, whereby the cover 32 is positioned with respect to the cartridge case 110 in the up-down direction. As a result, the cover 32 does not move upward. The pressing plate 134 moves downward against the urging force of the coil spring 133. When the pressing plate 134 moves downward, the ink receiving member 130 moves from the first position shown in FIGS. 13A and 13B to the second position shown in FIGS. 14A and 14B.

When the ink receiving member 130 is in the second position, the supply port 34 is connected to the supply tube 102 as the ink cartridge 30A moves frontward. The supply tube 102 pushes the valve 36, and the valve 36 moves rearward against the biasing force of the coil spring 37. The outer peripheral surface of the supply tube 102 connected to the supply portion 33 is in contact with the seal member 35 so as not to leak the ink.

Figure 15A:
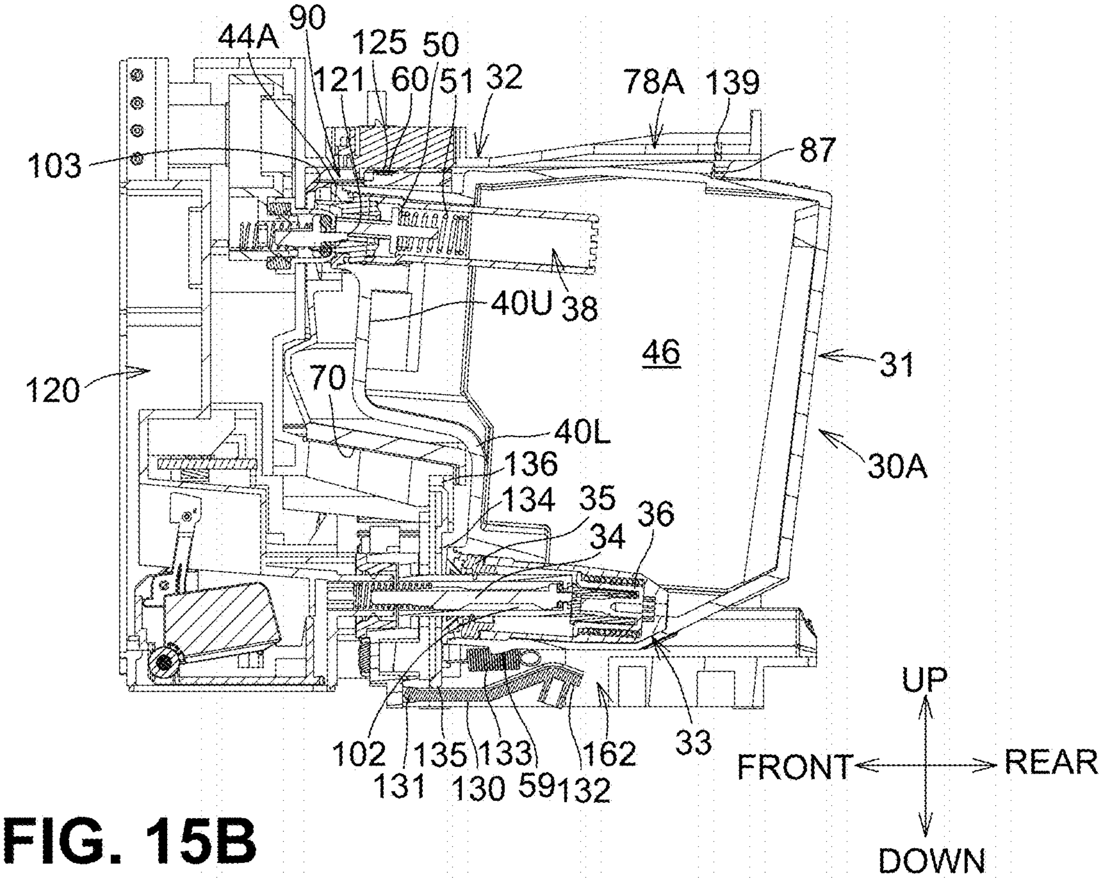
FIGS. 15A and 15B are cross-sectional views of the ink cartridge 30 and the cartridge case 110, each showing a state where the ink cartridge 30 is positioned in the cartridge case 110 and a supply tube 102 is inserted into a supply port 34.
Figure 15B:
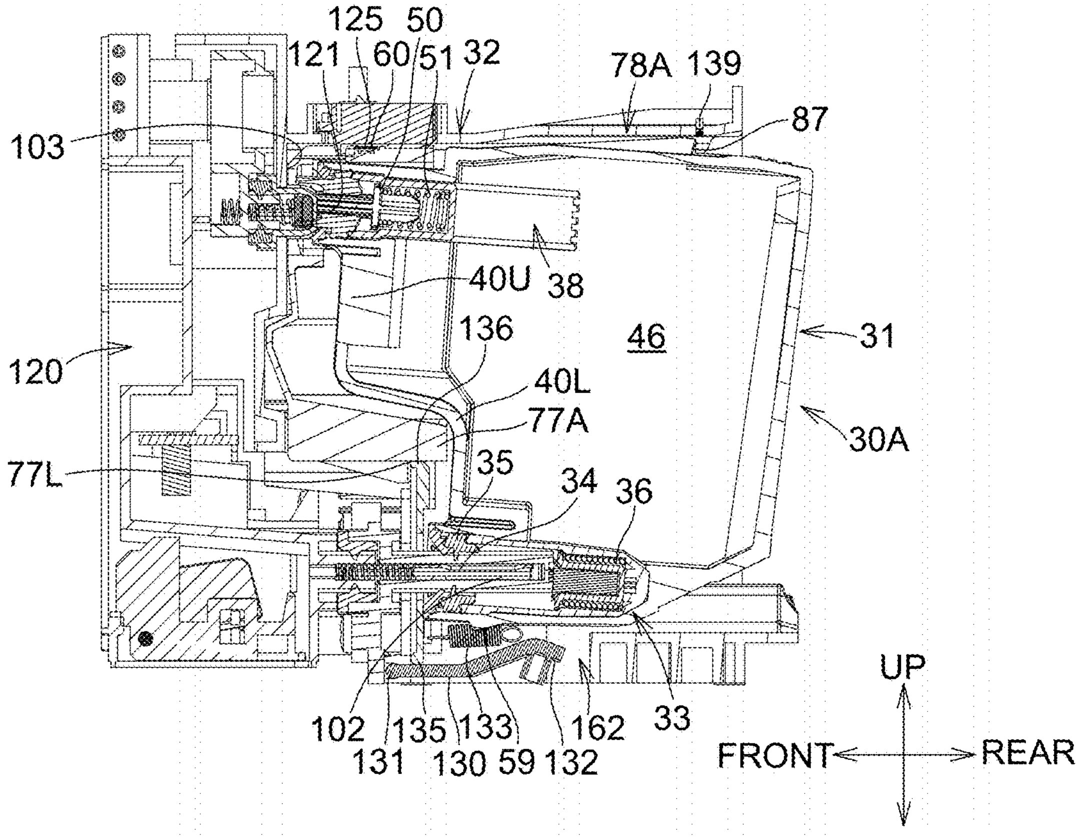

As shown in FIGS. 15A and 15B, as the ink cartridge 30A moves frontward, the rod 121 of the slot 108A comes into contact with the valve 50 positioned in the atmosphere communication path 501 of the main body 31 through the hole 76 of the cover 32. The rod 121 pushes the valve 50, and the valve 50 moves rearward against the urging force of the coil spring 51. When the valve 50 moves rearward, the atmosphere communication opening 501 is opened to allow air to flow between the outside and the chamber 46. The rod 121 is an example of a protrusion. Further, the electrodes 61 of the IC board 60 comes into contact with the contacts 125 and are electrically connected to the contacts 125. Further, the locking surface 87 of the second key portion 78A is positioned frontward of the locking portion 139. The contact surface 92 is positioned directly below the locking portion 139.

The contacts 125 are elastically deformable like a leaf spring, the contacts 125 apply a downward contact pressure to the electrodes 61 when the electrodes 61 contact the contacts 125. Further, the biasing force of the coil spring 133 indirectly acting upward on the cover 32. Although the contacts 125 apply the downward contact pressure to the electrodes 61 and the coil spring 133 applies the upward pressure to the first key portion 77A, the surface 74L or 74U of the grooves 74 absorbs the upward or downward pressure by the rib 118 and the rib 119 coming into contact with the surface 74L or 74U of the grooves 74. Accordingly, the force acting upward to the cover 32 and the force acting downward to the cover 32 are balanced.

Further, as shown in FIG. 15B, the position in the front-rear direction at which the upper end 136 of the pressing plate 134 is in contact with the first key portion 77A is different from the position in the front-rear direction at which the contacts 125 are in contact with the electrodes 61. Specifically, the position in the front-rear direction at which the upper end 136 of the pressing plate 134 is in contact with the first key portion 77A is positioned frontward of the position in the front-rear direction at which the contacts 125 are in contact with the electrodes 61. As a result, a force acts on the cover 32 to rotate the cover 32 about a rotation axis extending in the left-right direction such that the rear end side of the cover 32 moves more upward than the front end side thereof. On the other hand, as shown in FIG. 17, the rib 118 and the rib 119 come into contact with the surfaces 74L, 74U of the grooves 74, whereby the rotation of the cover 32 is suppressed.

Figure 17:
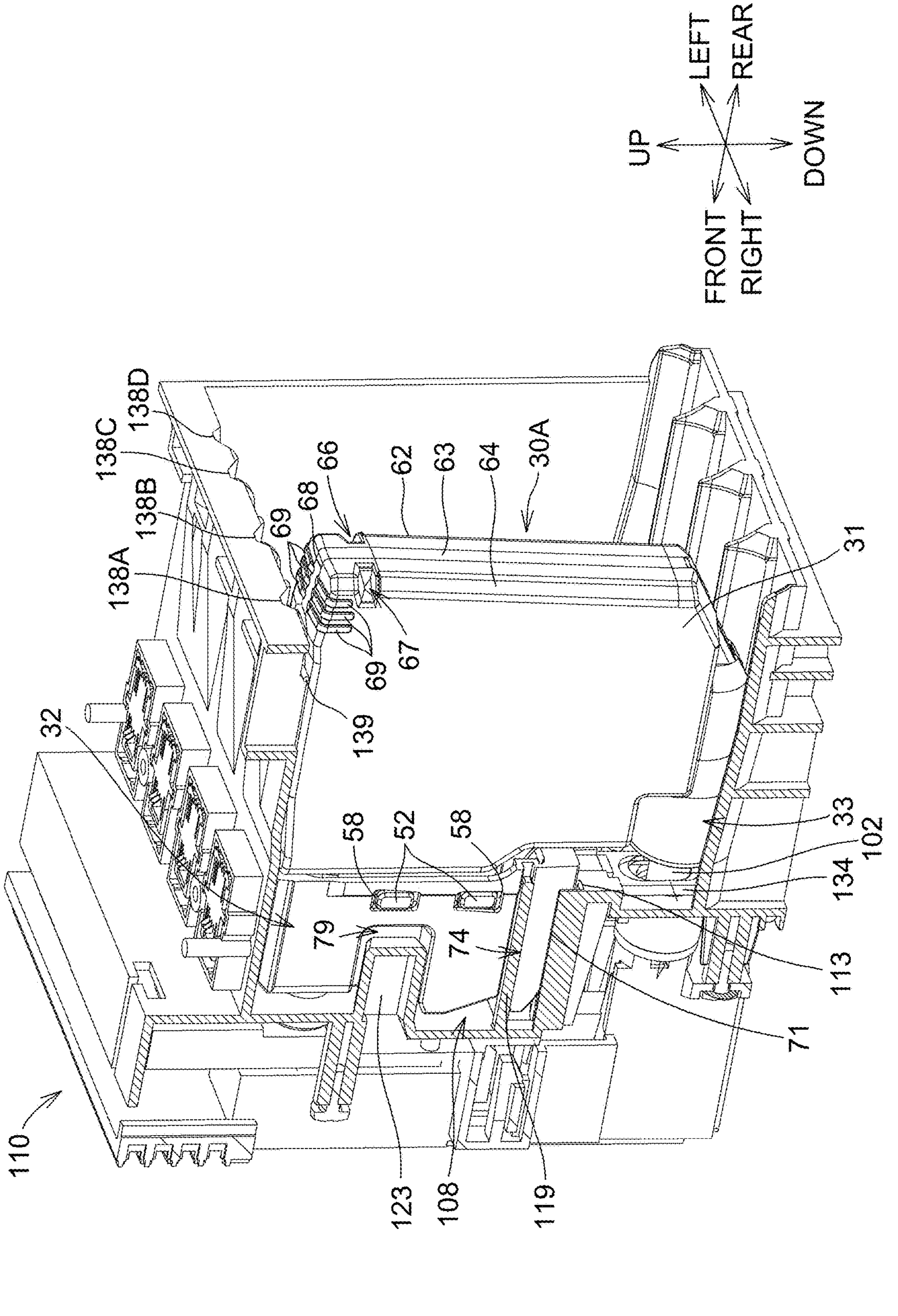
FIG. 17 is a partial cross-sectional perspective view of the ink cartridge 30 and the cartridge case 110, showing the attached state of the ink cartridge 30 where the ink cartridge 30 is attached to the cartridge case 110.

As shown in FIG. 17, when the ink cartridge 30A is inserted to be in the attached state in the slot 108A, the third key portions 79 matches with the fitting piece 122 and the fitting piece 123. It is assumed that an ink cartridge 30 which is sold in a different area, and which is not provided with one of the recessed portions of the third key portion 79 formed in the left wall 54 and the right wall 55 of the cover 32 is inserted into the slot 108D. In the slot 108D, the fitting piece 122 is positioned on the right side, and the fitting piece 123 is positioned on the left side. In the ink cartridge 30 in which one of the recessed portions of the third key portion 79 formed in the left wall 54 and the right wall 55 of the cover 32 is not provided, the front wall 53 of the cover 32 comes into contact with one of the fitting piece 122 and the fitting piece 123. Thus, the ink cartridge 30 cannot be further inserted into the slot 108D in the frontward direction. Since the ink cartridge 30 cannot be inserted into the slot 108D, it means that the ink cartridge 30 is identified as an ink cartridge 30 that is intended to be used in a printer sold in a sales area different from that of the printer 10.

Figure 16A:
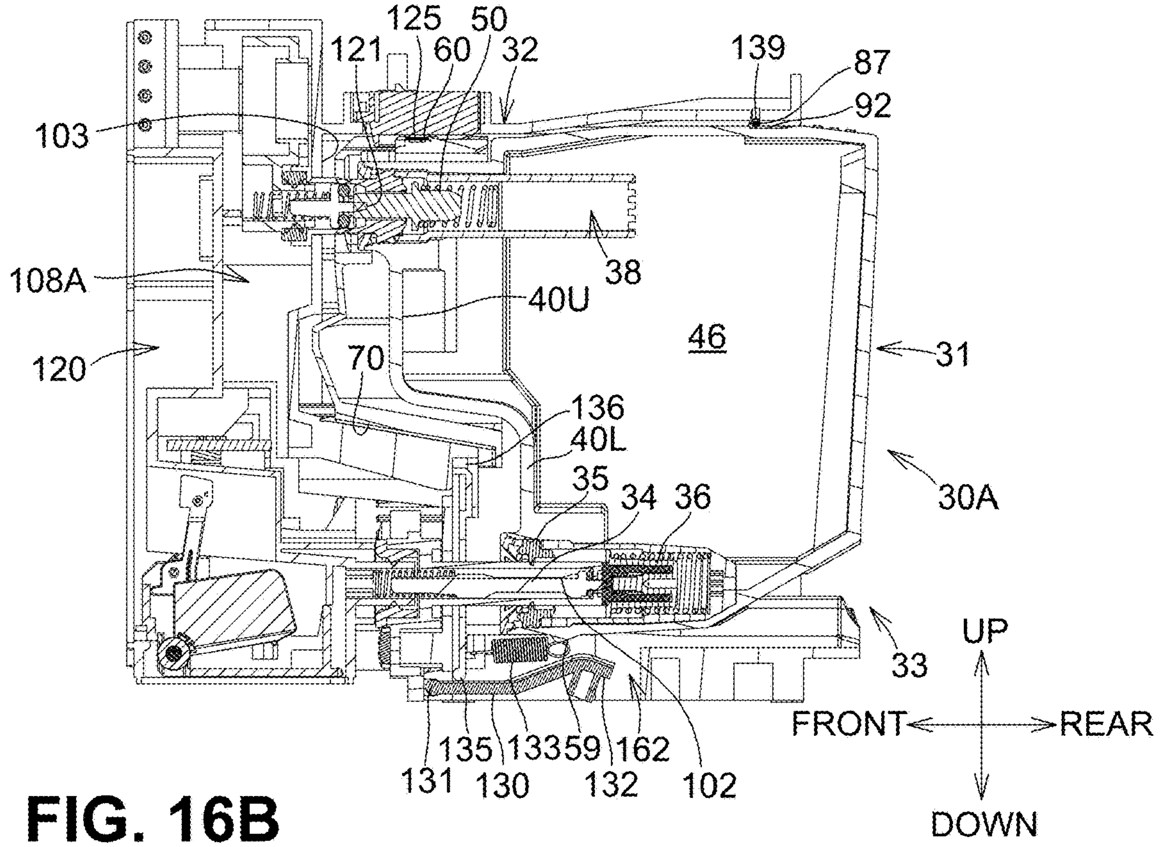
FIGS. 16A and 16B are cross-sectional views of the ink cartridge 30 and the cartridge case 110, each showing an attached state of the ink cartridge 30 where the ink cartridge 30 is attached to the cartridge case 110.
Figure 16B:
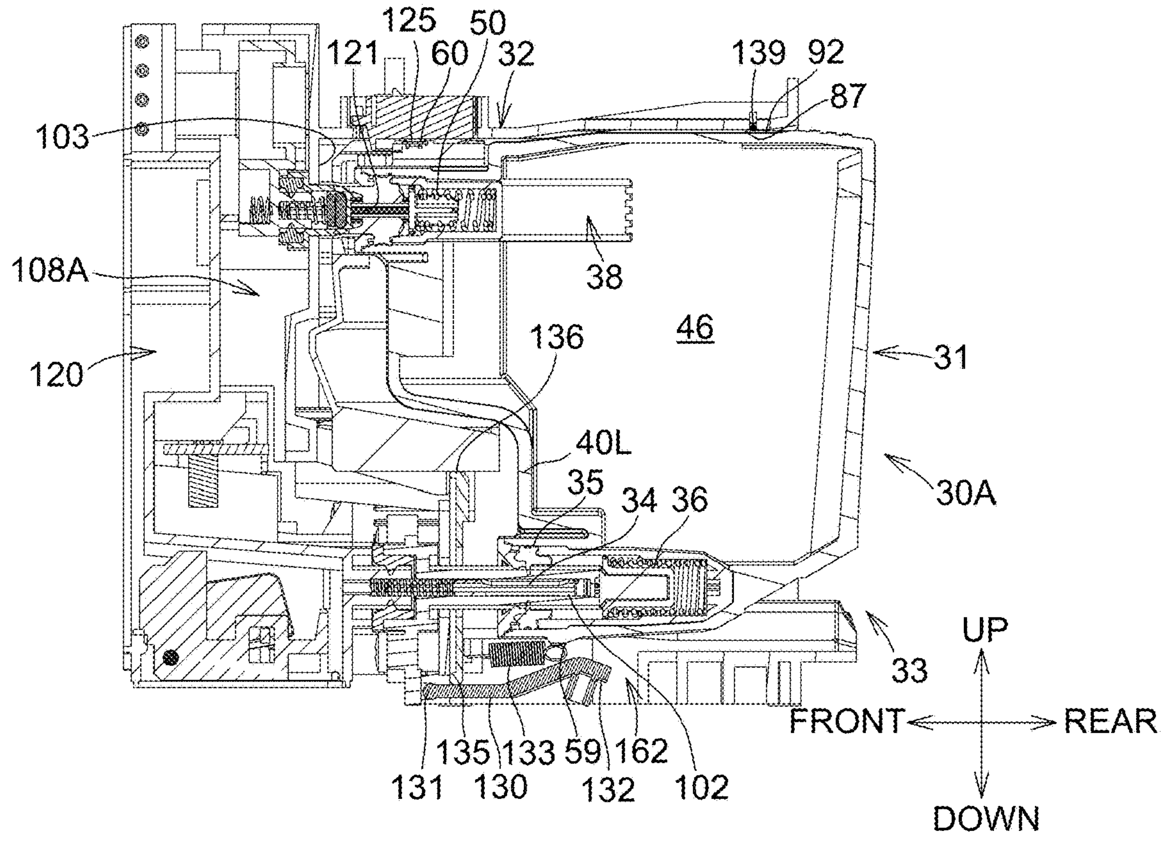

In the state shown in FIGS. 15A and 15B, the main body 31 is rotatable around the supply port 34 such that the rear end thereof is to be moved downward and upward in a state where the main body 31 is inserted in the slot 108A. More specifically, the main body 31 is rotatable around an axis extending in the left-right direction and passing through the center of the supply port 34 so that the rear end side thereof moves upward in the slot 108A. Although the position of the cover 32 with respect to the cartridge case 110 in the up-down direction is determined as described before, because the through hole 58 of the cover 32 is sufficiently larger than the outer shape of the protrusion 52 of the main body 31, the main body 31 can rotate like this. When the ink cartridge 30A rotates so that the rear end side moves upward, the locking surface 87 of the second key portion 78A and the locking portion 139 face each other in the front-rear direction. When the user removes his/her fingers from the ink cartridge 30A, the ink cartridge 30A is moved rearward by the urging forces of the coil spring 37 and the coil spring 51, and the locking surface 87 comes into contact with the locking portion 139 as shown in FIGS. 16A and 16B. Accordingly, the ink cartridge 30A is held in the attached state. Further, the contact surface 92 comes into contact with the locking portion 139. As a result, the main body 31 of the ink cartridge 30A is positioned in the up-down direction with respect to the cartridge case 110. In other words, the position of the ink cartridge 30A with respect to the cartridge case 110 in the up-down direction is determined.

In a state where the ink cartridge 30A is held in the cartridge case 110, the internal space of the ink cartridge 30A communicates with the atmosphere through the atmosphere communication path 501. As a result, the ink in the chamber 46 flows into the internal space of the supply tube 102 through the internal space of the supply portion 33 and is supplied to the sub-tank 120.

Further, the ink cartridge 30 is urged rearward by the coil spring 37 and the coil spring 51, but the locking surface 87 of the ink cartridge 30A and the lock portion 139 of the cartridge case 110 are brought into contact with each other, so that the rearward movement of the ink cartridge 30A is regulated. In this way, the ink cartridge 30A is held in the cartridge case 110.

In addition, in the attached state where the ink cartridge 30A is held in the cartridge case 110, the electrodes 61 of the IC board 60 are in contact with the contacts 125. Further, the electrodes 61 are electrically connected to the contacts 125 so that the IC can communicate with the control unit of the printer 10 via the electrodes 61 and the contacts 125.

In addition, in the attached state of the ink cartridge 30A, the downward force which the electrodes 61 of the ink cartridge 30A receive from the contacts 125 is transmitted to the supply tube 102 which is inserted into the internal space of the supply portion 33. Since the downward force transmitted to the supply tube 102 is weakened by the upward counteracting force by the biasing force of the coil spring 133 via the pressing plate 134, it is possible to reduce the possibility that the supply tube 102 is deformed.

It is assumed that an ink cartridge 30 having the first key portion 77 at the same position as the ink cartridge 30A and the second key portion 78 at the same position as the ink cartridge 30D is inserted into the rightmost slot 108A of the cartridge case 110 shown in FIG. 2. In the rightmost slot 108A, the first key slot 115A is positioned on the right side of the slot 108A in the left-right direction, corresponding to the position of the first key portion 77 of the ink cartridge 30A. On the other hand, the second key slot 138A is positioned on the left side with respect to the center of the slot 108A in the left-right direction, corresponding to the position of the second key portion 78 of the ink cartridge 30A, not of the ink cartridge 30D. Therefore, since the second key portion 78 of this ink cartridge 30 and the second key slot 108A of the second key slot 138A are misaligned in the left-right direction, the upper end surface 86 comes into contact with the case body 101 before the second key portion 78 enters the second key slot 138A as the ink cartridge 30 rotates. As a result, since the locking surface 87 and the locking portion 139 do not face with each other in the front-rear direction, the ink cartridge 30A is not held in the slot 108D. Since the main body 31 cannot be rotated, the user understands that the ink cartridge 30 is not the ink cartridge 30 to be inserted into the slot 108A.

It is assumed that an ink cartridge 30 having the first key portion 77 at the same position as the ink cartridge 30A and the second key portion 78 at the same position as the ink cartridge 30D is inserted into the rightmost slot 108A of the cartridge case 110 shown in FIG. 2. In the rightmost slot 108A, the first key slot 115A is positioned on the right side of the slot 108A in the left-right direction, corresponding to the position of the first key portion 77 of the ink cartridge 30A. Therefore, the first key portion 77 of the ink cartridge 30 can enter the first key slot 115A. On the other hand, the second key slot 138A is positioned on the left side with respect to the center of the slot 108A in the left-right direction, corresponding to the position of the second key portion 78 of the ink cartridge 30A, not of the ink cartridge 30D. Therefore, since the second key portion 78 of this ink cartridge 30 and the second key slot 108A of the second key slot 138A are misaligned in the left-right direction, the upper end surface 86 comes into contact with the case body 101 before the second key portion 78 enters the second key slot 138A as the ink cartridge 30 rotates. As a result, since the locking surface 87 and the locking portion 139 do not face with each other in the front-rear direction, the ink cartridge 30A is not held in the slot 108D. Since the main body 31 cannot be rotated, the user understands that the ink cartridge 30 is not the ink cartridge 30 to be inserted into the slot 108A.

Next, the movement of the ink cartridge 30A, which is in the attached state where the ink cartridge 30A attached to the cartridge case 110, is detached and removed from the cartridge case 110 will be described. As shown in FIG. 17, in the attached state, the rib 118 and the rib 119, which are in contact with the grooves 74, restrict the up-down movement and rotation of the cover 32. Since the main body 31 is relatively movable with respect to the cover 32, only the main body 31 is rotatable around the supply port 34, more specifically, around the axis extending in the left-right direction and passing through the center of the supply port 34, even when the movement in the up-down direction and the rotation of the cover 32 are restricted. By the rotation of the main body 31, the locking surface 87 and the locking portion 139 selectively contact with each other and are separated from each other in the up-down direction.

In the attached state, when the user presses down the operation surface 68 of the main body 31 with a finger, the rear end side of the main body 31 moves downward. Thus, the locking surface 87 and the locking portion 139 are separated from each other in the up-down direction. When the user removes his/her finger from the operation surface 68, the ink cartridge 30 is moved rearward in the slot 108A by the urging forces of the coil spring 37 and the coil spring 51.

In the attached state, the protrusion 59 of the ink cartridge 30A is positioned in the space 162 of the case body 101. As the ink cartridge 30A moves rearward in the slot 108A, the protrusion 59 also moves rearward in the space 162, and the protrusion 59 comes into contact with the front end of the guide surface 161. As a result, the rearward movement of the ink cartridge 30A is restricted, and as shown in FIGS. 14A and 14B, the ink cartridge 30A does not jump out from the slot 108A, and stands still in a state where the front side of the ink cartridge 30A is positioned in the slot 108A. Further, as shown in FIGS. 13A and 13B, when the ink cartridge 30A moves rearward, the protrusion 59 of the ink cartridge 30A separates from the guide surface 161 of the slot 108A, and the ink cartridge 30A is taken out from the slot 108A.

[Operation and Effect of Present Embodiment]

The ink cartridge 30 includes the front portion 511 that defines the front end of the through hole 90 in the upper wall 56 of the cover 32. Therefore, for example, when the ink cartridge 30 falls on the floor, even if a strong impact is generated around the front portion 511 of the cover 32, the front portion 511 is easily deformed, and thus the impact of the falling is easily absorbed by the front portion 511. Since the through hole 90 is positioned between the front portion 511 and the electrode 61 of the IC board 60, the force generated by the deformation of the front portion 511 is easily dispersed to the right wall 55 and the left wall 54 connected to the front portion 511. Therefore, the impact is less likely to be transmitted from the front portion 511 to the periphery of the IC board 60 on the upper wall 56, and thus the deformation of the periphery of the IC board 60 on the upper wall 56 is suppressed. As a result, the position of the electrode 61 of the IC board 60 is less likely to be displaced. This configuration suppresses a connection failure between the electrode 61 of the IC board 60 and the contact 125 of the case 110 when the ink cartridge 30 is attached to the case 110. Therefore, the controller of the printer 10 can read the information stored in the IC board 60 of the ink cartridge 30 through the contact 125 more reliably.

The front end of the front portion 511 of the ink cartridge 30 is connected to the front wall 53 at the right end and the left end. Therefore, the force generated by the deformation of the front portion 511 is easily dispersed to the front wall 53, and thus the front portion 511 is improved.

Since the main body 31 of the ink cartridge 30 is movable in the up-down direction and the front-rear direction relative to the cover 32, the position of the IC board 60 is determined in the cartridge case 110 independently of the main body 31. Therefore, the position of the IC board 60 can be easily determined with respect to the cartridge case 110. When the ink cartridge 30 is attached to the cartridge case 110, the main body 31 moves relative to the cover 32 in the up-down direction and the front-rear direction. Even when the front end 44A of the upper wall 44 of the main body 31 moves upward in the clockwise direction, the front end 44A of the upper wall 44 is positioned below the through hole 90 of the cover 32. Thus, the contact of the front end 44A of the upper wall 44 to the upper wall 56 of the cover 32 is suppressed by the through hole 90.

The left and right guide pieces 91 are provided near the left and right ends of the upper wall 56 of the cover 32 of the ink cartridge 30. The guide pieces 91 protrude upward from the upper surface 511A of the front portion 511. Therefore, the force generated by the deformation of the front portion 511 is easily dispersed to the left and right guide pieces 91, and thus the strength of the front portion 511 is improved.

When the ink cartridge 30 is attached to the case 110, the inclined surface 511B of the front portion 511 of the cover 32 comes into contact with the contact 125 of the case body 101 in the frontward direction. Therefore, the cover 32 is guided in the up-down direction with respect to the case 110 while reducing the impact caused by the contact between the cover 32 and the contact 125.

The upper wall 56 of the cover 32 of the ink cartridge 30 includes the right portion 512 that defines the right end of the through hole 90 and extends rearward from the right end portion of the rear end of the front portion 511, and the left portion 513 that defines the left end of the through hole 90 and extends rearward from the left end portion of the rear end of the front portion 511. Therefore, the force generated by the deformation of the front portion 511 is easily dispersed rearward from the front portion 511, and thus the strength of the front portion 511 is improved.

When the ink cartridge 30 is attached to the case 110, the rod 121 of the case 110 is inserted into the through hole 76 of the cover 32, and the valve 50 is pressed rearward to open the atmosphere communication path 501 of the main body 31. Therefore, when the ink in the chamber 46 is supplied to the sub-tank 120 through the internal space of the supply portion 33 and the internal space of the supply tube 102, air easily flows into the chamber 46 through the atmosphere communication path 501. Therefore, the ink in the chamber 46 is easily supplied to the sub-tank 120.

[Modification]

The front end of the upper wall 56 of the cover 32 of the ink cartridge 30 is connected to the upper end of the front wall 53. Alternatively, the front end of the upper wall 56 may not be connected to the upper end of the front wall 53. In this case, the upper end of the front wall 53 may be lower than the upper wall 56.

The ink cartridge 30 described above includes the main body 31 and the cover 32. Alternatively, the main body 31 and the cover 32 may be integrally formed. In this case, the front wall of the ink cartridge 30 corresponds to the first wall. The right wall of the ink cartridge 30 corresponds to the second wall. The left wall of the ink cartridge 30 corresponds to the third wall. The upper wall of the ink cartridge 30 corresponds to the fourth wall. Further, in this case, the through hole 90 in the upper wall of the ink cartridge 30 may be closed by a semipermeable membrane that blocks the passage of ink and allows the passage of air. In this case, the atmosphere communication port 501, the through hole 76, and the valve mechanism 504 may be omitted.

The main body 31 of the ink cartridge 30 is movable in the up-down direction and the front-rear direction with respect to the cover 32. Alternatively, the main body 31 may be movable only in the up-down direction.

The ink cartridge 30 described above includes the left and right guide pieces 91 protruding upward from the upper surface 511A of the front portion 511. However, at least one of the left and right guide pieces 91 may be omitted.

The front portion 511 of the ink cartridge 30 described above has the inclined surface 511B. However, the inclined surface 511B may be omitted.

The ink cartridge 30 described above includes the right portion 512 and the left portion 513 extending rearward from the rear end of the front portion 511 of the cover 32. However, at least one of the right portion 512 and the left portion 513 may be omitted.

The through hole 90 of the ink cartridge 30 described above has a rectangle shape that is longer in the left-right direction than in the front-rear direction as viewed from above, but may be formed such that the length in the left-right direction becomes shorter toward the rear. With this configuration, the length between the right portion 512 and the left portion 513 of the upper wall 56 of the cover 32 in the left-right direction increases toward the rear, and thus the force generated by the deformation of the front portion 511 is easily dispersed from the front portion 511 to the right portion 512 and the left portion 513. Therefore, the strength of the front portion 511 is improved.

Figure 18:
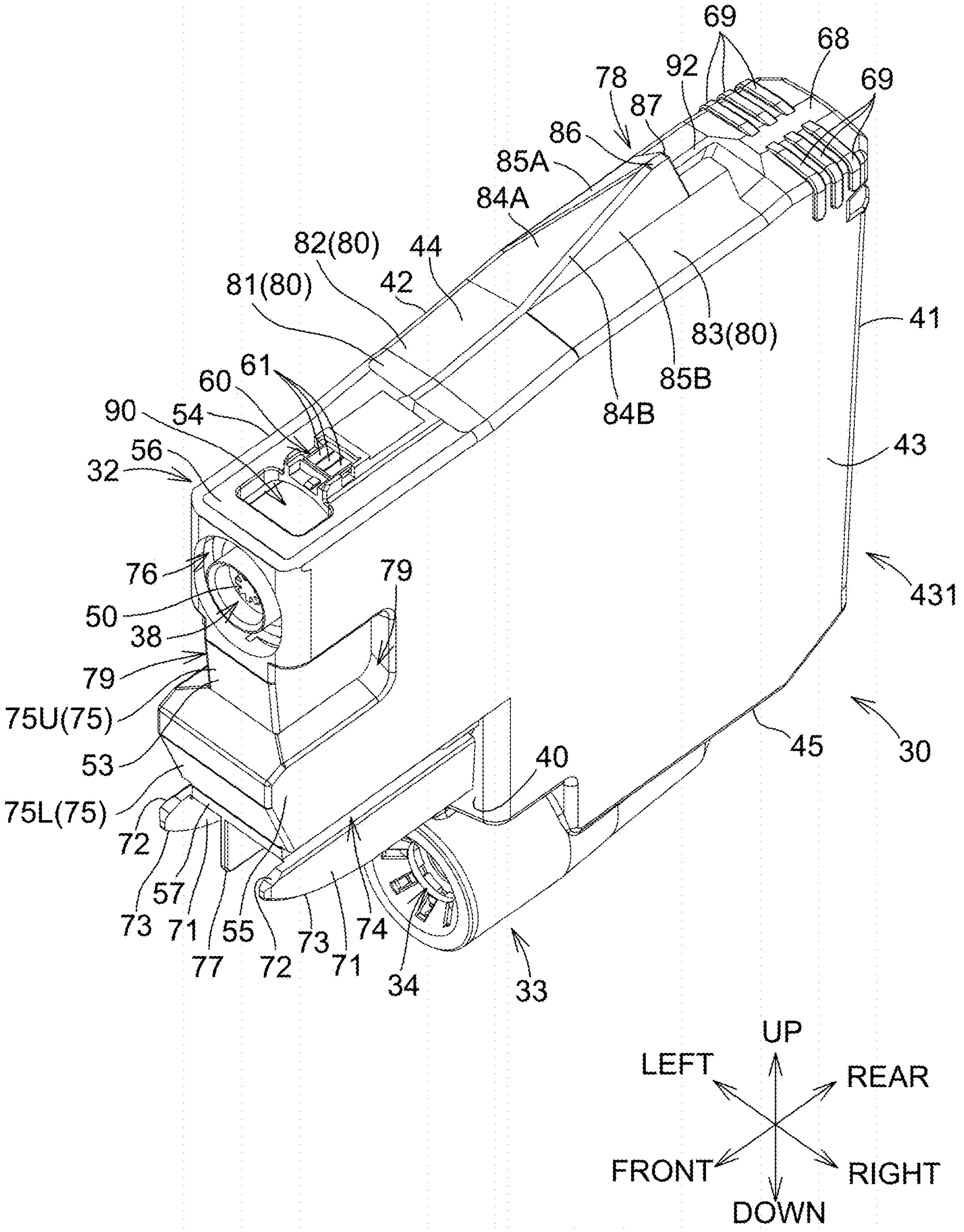
FIG. 18 is a perspective view of an ink cartridge 30 according to a modification, as viewed from the front and above.

In the above-described embodiment, the ink cartridge 30 includes the main body 31 and the cover 32. Alternatively, as shown in FIG. 18, the ink cartridge 30 may have a container 431 in which the main body 31 and the cover 32 are integrally molded. In this case, the container 431 stores ink. The first key portion 77, the second key portion 78, and the IC board 60 are positioned in the container 431.

In the above-described embodiment, the atmosphere communication path 501 is positioned in the upper front wall 40U of the main body 31. Alternatively, the atmosphere communication path 501 may be positioned in a wall other than the front wall 40 of the main body 31, for example, in the upper wall 44.

In the above-described embodiment, the pressing plate 134 and the ink receiving member 130 are arranged in the cartridge case 110. However, the pressing plate 134 and the ink receiving member 130 may also be omitted. In other words, the first key portion 77 may realize only the function of identifying the characteristic of the ink cartridge 30.

The second key portion 78 may not have the locking surface 87. In other words, the second key portion 78 may be configured to only identify the characteristics of the ink cartridge 30.

In the above-described embodiment, the ink cartridge 30 is described as an example of the ink container. However, the ink container may be a bottle for replenishing ink to a tank of the printer, instead of the cartridge mounted on the printer 10.

What is claimed is:

1. An ink container insertable into an attachment unit comprising:

a main body that includes a chamber configured to store ink therein;

a supply portion that extends forward from the chamber and is configured to supply the ink in the chamber to an outside of the main body; and an electrical interface that is positioned upward of the supply portion and apart from the supply portion and has an electrode, wherein the main body includes:

a first wall;

a second wall that is continuous with the first wall and faces rightward;

a third wall that is continuous with the first wall and faces leftward; and a fourth wall that is continuous with the second wall and the third wall and faces upward, the electrical interface is positioned on the fourth wall, the fourth wall has a through hole positioned forward of the electrode and has a front end portion that defines a front end of the fourth wall and a front end of the through hole.

2. The ink container according to claim 1, wherein the front end portion has a front end whose right end and left end are continuous with the first wall.

3. The ink container according to claim 1, wherein the first wall has a second through hole positioned downward of the front end portion.

4. The ink container according to claim 3, wherein the main body includes:

a first member that includes a partition wall defining the chamber; and a second member that includes the first wall, the second wall, the third wall, and the fourth wall, the first member is attached to the second member to be movable in an up-down direction with respect to the second member, and the partition wall has a portion that is an upper end and a front end thereof, and the portion is positioned below the through hole.

5. The ink container according to claim 4, wherein the first member has an atmosphere communication path configured to communicate with the chamber and an outside, the ink container further comprises a valve positioned in the first member and configured to open and close the atmosphere communication path, the valve is exposed through the atmosphere communication path and the second through hole, and the second through hole is configured to receive a protrusion that extends from the attachment unit.

6. The ink container according to claim 1, wherein the front end portion has an upper surface that faces upward, and the main body includes:

a first protrusion that is positioned rightward of the through hole and protrudes upward from the upper surface; and a second protrusion that is positioned leftward of the through hole and protrudes upward from the upper surface.

7. The ink container according to claim 1, wherein the front end portion has:

an upper surface that faces upward; and an inclined surface adjacent to a front of the upper surface and inclined with respect to the upper surface so as to extend downward toward a front.

8. The ink container according to claim 1, wherein the fourth wall has:

a first portion that is continuous with a rear end of the front end portion and extends leftward from the second wall; and a second portion that is continuous with the rear end of the front end portion and extends rightward from the third wall, the first portion defines a right end of the through hole, and the second portion defines a left end of the through hole.

9. The ink container according to claim 1, wherein the through hole has a length, in a direction orthogonal to a front direction and an upward direction, that decreases toward a rear.

* * * * *